(12) United States Patent
Argiro

(10) Patent No.: US 9,158,387 B2
(45) Date of Patent: *Oct. 13, 2015

(54) ACTIONABLE-OBJECT CONTROLLER AND DATA-ENTRY ATTACHMENT FOR TOUCHSCREEN-BASED ELECTRONICS

(71) Applicant: Chris Argiro, Toronto (CA)

(72) Inventor: Chris Argiro, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/062,824

(22) Filed: Oct. 24, 2013

(65) Prior Publication Data

US 2014/0049475 A1    Feb. 20, 2014

Related U.S. Application Data

(63) Continuation of application No. 13/635,836, filed as application No. PCT/IB2011/051049 on Mar. 12, 2011, now Pat. No. 8,599,162, which is a continuation-in-part of application No. 13/005,315, filed on Jan. 12, 2011, now Pat. No. 8,368,662.

(60) Provisional application No. 61/344,158, filed on Jun. 2, 2010, provisional application No. 61/282,692, filed on Mar. 18, 2010.

(51) Int. Cl.
| | |
|---|---|
| *G09G 5/00* | (2006.01) |
| *G06F 3/02* | (2006.01) |
| *G06F 3/041* | (2006.01) |
| *G06F 3/01* | (2006.01) |
| *G06F 3/044* | (2006.01) |
| *G06F 3/0488* | (2013.01) |

(52) U.S. Cl.
CPC .............. *G06F 3/0219* (2013.01); *G06F 3/016* (2013.01); *G06F 3/041* (2013.01); *G06F 3/044* (2013.01); *G06F 3/0416* (2013.01); *G06F 3/04886* (2013.01); *G06F 2203/04809* (2013.01)

(58) Field of Classification Search
CPC ............ G06F 3/04886; G06F 3/04883; G06F 3/04817; G06F 3/0488; G06F 3/041; G06F 3/0484; G06F 3/048; G06F 3/0482; G06F 3/04842; G06F 3/0412; G06F 3/0481; G06F 3/04847; G06F 9/4445; G06F 3/017; G06F 2203/04808; G06F 3/038; G06F 3/0416; G06F 17/30554; G06F 17/3059
USPC .................................................. 345/156–181
See application file for complete search history.

(56) References Cited

U.S. PATENT DOCUMENTS

| | | | |
|---|---|---|---|
| 2009/0161027 A1* | 6/2009 | Hardacker et al. ............ | 348/734 |
| 2010/0026635 A1* | 2/2010 | Dimitrov et al. .............. | 345/173 |

* cited by examiner

*Primary Examiner* — Duc Dinh
(74) *Attorney, Agent, or Firm* — Carrier Blackman & Associates, P.C.; Joseph P. Carrier; William D. Blackman

(57) ABSTRACT

A touchscreen-controller and data-entry ensemble are attached conterminously or proximately to a touchscreen device. A touchscreen-controller attachment device has one or more input ends and one or more output ends. The input and output ends may be opposite ends of unitary elements and/or may be remote from one another and connected by wire or wirelessly. Each input end of a unitary conductive element is connected to a respective output end and the plurality of output ends, residing in an attachment base, are in a position of contact with or in close proximity to the soft buttons, keys or controller(s) of a touchscreen. The output ends thus activate the touchscreen when the input ends are manipulated. A base maintains the input and/or output ends in fixed position during use. Input and output elements can be spring-mounted. New controllers offer the user haptic ability.

4 Claims, 15 Drawing Sheets

ACTIONABLE-OBJECT CONTROLLER AND DATA-ENTRY ATTACHMENT FOR TOUCHSCREEN-BASED ELECTRONICS

This application is a continuation application which claims priority to U.S. application Ser. No. 13/635,836 filed on Jan. 2, 2013, which claims priority to U.S. patent application Ser. No. 13/005,315 filed Jan. 12, 2011 which claims priority to U.S. provisional application Ser. No. 61/344,158 filed Jun. 2, 2012 and U.S. provisional U.S. application Ser. No. 61/282,692 filed Mar. 18, 2010, the contents of which are hereby incorporated by reference in their entirety.

BACKGROUND

The present invention relates to the technical field of touchscreen-based electronics. Touchscreen-based electronics, in both a portable and stationary environment, can include a wide array of devices such as: personal and notebook computers, netbooks, ATMs, POS or information kiosks, ticket-dispensing machines, portable media players, personal digital assistants, monitors, televisions, tablets, branded i-devices and Mobile Internet Devices or MIDs, such as multi-media and Internet-enabled Smart phones; although this list is not intended to be exhaustive. Touchscreens allow users of these devices to input commands, engage in data entry or otherwise control an actionable object or on-screen graphic through touch—typically by finger, thumb or stylus contact. The touchscreen senses the coordinates of the "touch," through any of the varying means of touchscreen-based technologies, including, but not suggestive of limitation to, those that are capacitive-and-resistive governed. The coordinate data registered via "touch-sensing" can then be relayed to the device's controller (or processor) for related processing and can further see execution by software associated with applications running on an electronic-touchscreen in order to initiate a desired action.

Coordinate-data determination at the point of contact, of course, is technology specific. With resistive touchscreen technologies, for example, the touchscreen panel is comprised of several layers; notably two electrically-conductive membranes that are typically separated by an extremely thin non-conductive gap. When pressure is applied to the flexible topmost layer, contact is made with its conductive pairing, effectively completing "the circuit" at the point of contact and thus, engaging the related hardware for specific coordinate-data determination and related processing.

In a capacitive-sensor system, the touchscreen panel, typically glass coated with a material such as indium tin oxide to enhance conductivity across a sensor device, acts as a sensor. In preamble, a biological property of the human body is its ability to carry and store an electrical charge—a case in reference being the electrons contained in your finger. The capacitive-sensor system utilizes a conductive input, usually a user's finger, to register touch (and is ideally capable of collectively tracking 10 or more fingers concurrently). Finger contact with the capacitive-based touchscreen panel alters the electrostatic field, which is then interpreted by the processor and device's software, such as any pre-installed input-driven software, translating this touch into a gesture or command. Respective capacitive touchscreens feature electrostatic-field monitoring circuitry, with points that can be arranged in the form of a grid. Each point on the grid is designed to register changes in electrostatic fields and process them accordingly, making multi-touch and multi-gestures possible.

Input-driven software includes touch-requisite applications such as those fueling an ever-growing list of smart-phone "apps". In associative transition, despite mobile apps being wildly popular, a direct consequence of the pocket-sized footprint of portable gadgets may see a user experience that is greatly attenuated by significant limitations of control of an actionable object or "an on-screen graphic". Contributing factors may include the device's small screen size and tiny on-screen control-keys, the size and sensitivity of the positioning of a user's fingers, the diversity and changing landscape of the soft keys and the unnatural fit for many of controlling or navigating an actionable object whilst the touchscreen-enabled hardware is concurrently grasped. In the ease of gaming applications on portable hardware, where control of an actionable object or player for a particular gaming title becomes more intricate, these limitations of control can be exacerbated.

The imprecise nature of traditional, graphic-based touchscreen controllers of an actionable object may be especially apparent when console-born gaming titles are adapted to the small screen (pocket gaming), and controllers and control efficacy between both platforms can be compared based on a user's experience. Even simple left, right, upward and downward navigation that is engaged by a touchscreen's soft buttons or keys, in a traditional manner, may prove difficult to execute in certain environments. Peer-based, business or SMS (Short Message Service) testing in data-entry applications, additionally, can suffer from a tiny-portable footprint, where the "hunt and peck", for example, may not always be as productive as first intended. With one's finger size often bigger than the soft keys or buttons it was designed for, this can lend itself to accidental "key bleed" between neighboring keys—that is, with neighboring keys accidentally being touched in data-entry execution over the intended ones or, similarly, a plurality of keys accidentally being touched concurrently, instead of an intended single-key execution.

Circumstances may arise where it would be desirable to operate the soft buttons displayed on the touchscreen from a distance or using an alternate input device; in both a portable and stationary (notwithstanding its larger form factor) environment.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

Embodiments herein are directed to systems, devices and methods for improving the control performance and data-entry efficacy and functionality of soft buttons or soft keys displayed on congruous touchscreens; when used in stationary and portable devices.

In some embodiments, a touchscreen-controller attachment is attached conterminously or proximately to a touchscreen. The touchscreen-controller attachment provides a physical interface for a touchscreen controller displayed as soft keys on a touchscreen.

According to an embodiment, a touchscreen-controller attachment device has one or more input ends and one or more output ends. The input and output ends both serve as conductive elements. Each input end is connected to a respective output end and the output ends, residing in an attachment base, are configured to be respectively affixed, in a position of contact with or in close proximity to and awaiting manipulation that engages contact with, the soft buttons, keys or controller(s) of a touchscreen. The output ends are thus configured to activate the touchscreen when one or more of the input ends is manipulated. The base can include a plurality of channels, with each of the plurality of channels designed to house either a fixed or removable output end. Unlike resistive touchscreens that sense pressure on a touchscreen from an output end regardless of the presence of an electrical signal, traditional capacitive touchscreens require a conductive path to remain present between the input and output end.

In some unitary element embodiments, there may be at least one spring chamber extending through a controller base channel; said channel or chamber collectively housing both the unitary element and a coil spring. As the input end of a housed (by a coil wrap) unitary element is manipulated, the output end is engaged contactually to a touchscreen. In such an embodiment, both the spring and output end preferably assume a position of rest upon deapplication of the input end of a unitary element. Each pair of input and output ends are opposite ends of a unitary element and serve to complete a conductive path in the spirit and scope of this discourse.

Varying the contactual alignment of the output ends with the soft-buttons, for instance at the soft-button's outermost edges, allows for physical expansion of the size of the tactile controller from the fixed dimensions of the soft-button controller, which may be coveted in scenarios revolving around a pocket-gaming environment.

In some embodiments, a touchscreen-controller assembly provides an interface between a touchscreen controller displayed as soft keys on a portable-or-stationary device's touchscreen and a physical controller device that is designed for remote operation. That is, an actionable-object controller device that operates remotely from the portable or stationary device. Remote operation is delineated in both wired and wireless expressions.

According to a remote embodiment, the input ends are remote from the output ends and are connected to the output ends by wire or wirelessly. Components may include a remote, hand-controller base, housing one or more input ends, a transceiver that is communicatively coupled—wirelessly—with a remote, hand-controller base, and at least one conductive filament; the at least one conductive filament (housed in a specially insulated cable) having a first end and a second end, where the first end is communicatively coupled with the transceiver, and wherein the second end is communicatively coupled with an output end. Some remote embodiments, such as those that are transceiverless, may also see at least one conductive filament, the at least one conductive filament (housed in a specially insulated cable) having a first end and a second end, where the first end is communicatively coupled to one of the input ends of a remote, hand-controller base, and the second end is communicatively coupled to one of the output ends.

In haptic embodiments, a hand-gripped controller—containing at least one or more input ends—also houses at least one vibration motor; whereas a vibration motor is engaged according to directives administered through haptic association with a broadcast agent such as a user device. Haptic association may be married to a transceiver or haptic directives can be interpreted directly by a specially-designed, independent hand-gripped controller. Both wired and wireless mediums can be utilized to complete the necessary conductive path of a unitary element, in the spirit and scope of this discourse.

According to an embodiment, a data-entry attachment provides an interface between data-entry-based soft keys, including, but not limited to, symbols, numbers, alphabetic characters, graphics; also navigation, function, toggle and modifier keys (such as Ctrl, Shift, Alt, and so forth) and a physical data-entry controller (such as a keyboard, keypad or similar data-entry device), located remotely from the portable or stationary device.

According to an embodiment, a data-entry attachment device includes a plurality of output elements and a plurality of input keys, each input key communicatively coupled to at least one of the plurality of output elements via wires or wirelessly. In a wired environment, the plurality of output elements are affixable to the touchscreen of a user device. The output elements are conductive elements and the input keys (inherently conductive) also act as conductive elements; with each input key communicatively coupled, respectively, to at least one of the plurality of output elements via one or more conductive wires. A specially designed transceiver with attachable matrix would permit wireless coupling serviceable to this embodiment. In toggle mode, at least one of the output elements is communicatively coupled with at least two input keys, whereby activation of either input key activates the associated, coupled output element.

According to an embodiment, a suspension device with a grip-friendly stead is introduced. The suspension device is adapted to house a touchscreen device, an adjustable stem member having a first end and a second end, and at least one slotted groove designed to house the first end of the adjustable stem member; the second end being attachable—or seeing fixed attachment—to an attachable-controller device or touchscreen-controller attachment; whereas said touchscreen-controller attachment (with housed conductive elements) seeks direct attachment to the touchscreen at its base, in the spirit and scope of this discourse. The suspension device may be constructed to provide for an attachment plurality; an embodiment is further described where the attachment device is at least one of a touchscreen-controller attachment and a magnification device, and whereas the suspension device includes at least one handle component and the at least one handle is contoured to a user's hand.

In some embodiments, two or more input keys may be communicatively connected with a single actuating element such that activation of either input key activates the coupled actuating element. Any of the described embodiments may use an AV cable output configured to connect to a touchscreen device that allows touchscreen device output to be viewed on a television screen, freeing touchscreen device input and/or output from the constraints of the touchscreen device. Any of the disclosed embodiments may use actuating elements that instead of being conductive, exert, pressure on the touchscreen or otherwise are configured to activate a given non-conductive touchscreen technology. In some embodiments, an innate capacitive source and capacitive manager allow conductive output ends to be engaged without direct user contact or a direct conductive connection between input and output ends by drawing from the innate capacitive source. The actuating elements may be configured to control an actionable-object on the touchscreen.

These and further and other objects and features of the invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the art to make and use these embodiments and others that will be apparent to those skilled in the art. The invention will be more particularly described in conjunction with the following drawings wherein.

DETAILED DESCRIPTION

Figure 1:
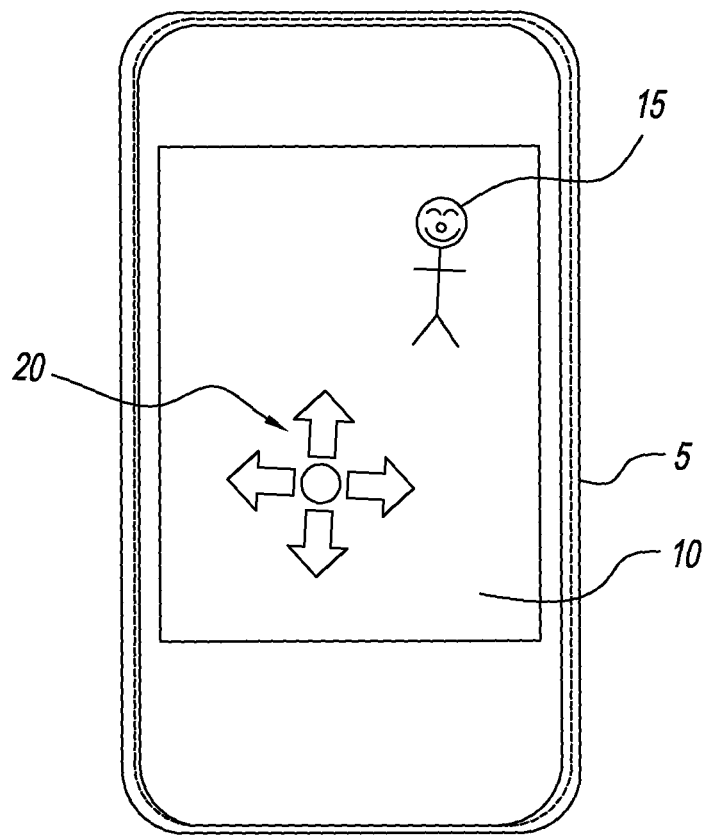
FIG. 1 is a top view of a soft-key or soft-button touchscreen controller (graphically-based) and a controllable or actionable object on a touchscreen, according to prior art.

Embodiments herein are directed to systems, devices and methods for improving input function of soft-button controllers (graphical representations that are engaged by—or respond to—the control input of a finger in order to carry out a function) and/or any respective soft key or keys and/or graphical representations situated on a capacitive touchscreen, particularly; in both stationary and portable devices. The disclosures herein are provided to lend instance to the operation and methodology of the various embodiments and are neither intended to suggest limitation in breadth or scope nor to suggest limitation to the claims appended hereto. Furthermore, such exemplary embodiments may be applicable to all suitable touchscreen-hardware platforms (tablets, smart phones, monitors, televisions, point-of-display, etceteras) and can also include all suitable touchscreen technologies, beyond capacitive and capacitance governed, such as those inclined with resistive touchscreens that, too, respond to touch input, albeit with its own peculiarities related to the technology. Those skilled in the art will understand and appreciate the actuality of variations, combinations and equivalents of the specific embodiments, methods and examples listed herein.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect said feature, structure, or characteristic in connection with other embodiments whether or not explicitly described.

While a functional element may be illustrated as being located within a particular structure, other locations of the functional element are possible. Further, the description of an embodiment and the orientation and layout of an element in a drawing are for illustrative purposes only and are not suggestive of limitation.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail.

The description is not to be taken in a limiting sense, but is made merely for the purpose of illustrating the general principles of the invention.

In the description that follows, the term "portable device" encompasses portable media players, personal digital assistants, laptop computers, tablets, branded i-devices and multimedia and Internet-enabled smart phones, amongst others similarly situated.

In the description that follows, the term "stationary device" encompasses a device that is generally operated in a fixed location. A stationary device may be movable or transportable, but is generally not operated while in transit.

Whilst embodiments may be illustrated using portable devices, the particularity of these embodiments are not limited to application of portable devices and may instead be applied to stationary devices. For purposes of the discussion that follows, the term "user device" encompasses both portable and stationary devices.

In the discourse that follows, the terms "soft button" or "soft keys" can encompass a graphical representation of a D-pad (directional pad) or gamepad, a physical button, a switch, a pointer, an alphanumeric key, data-entry key or any input-seeking graphical representation on a touchscreen; that may be engaged by a user through touch in order to enter a command, indicate a selection, input data or engage or control an actionable object located on the touchscreen. Touch gestures are registered by the touchscreen through interpretation by a processor; in collaboration with the respective software running on the user device.

In the description that follows, the term "attachment" generally refers to a device or assembly that is placed in contact with the soft-buttons on a touchscreen for purposes of engaging control of an actionable object or series of objects, such as those that may be present in gaming, enterprise, office suites, text or data-entry, media, graphics and presentation applications, although these applications are not suggestive of limitation. In certain scenarios, soft-button deployment through attachment contact is not automatic and requires prior manipulation of usually proximal conductive elements for engagement. An attachment may be adapted for both wired and wireless expressions.

In the description that follows, the term "remote operation" refers to a physical controller assembly, interface or device that is intended to be operated remotely from the touchscreen.

Embodiments of the present invention are described in more detail below, under dissertation of introduced Figures, with reference to the accompanying drawings.

Actionable-Object Controller Attachment

FIG. 1 illustrates a top view of a soft-key or soft-button controller and an actionable or controllable object on a touchscreen, according to prior art.

A user device 5 utilizes a touchscreen 10. An application running on the user device 5 displays soft buttons 20 that are designed to effect control an actionable object 15. The actionable object 15 is illustrated as a graphic on the touchscreen 10 and may be a player, character, numerical or alphabetic rendering, cursor, pointer, icon or any other graphical representation that is to be controlled by the rendered soft buttons 20. In a data-entry sense, the term actionable object 15 can be used interchangeably with the soft-buttons 20 themselves. Such is the case when a soft-button, for instance, comprises an alphanumeric character. In this way, as a soft-button is touch engaged, it can directly translate the gesture into user input in a data-entry application.

As noted previously, due to a user device's 5 potentially small-screen size and concomitant tiny on-screen soft buttons 20, significant limitations of control can be a direct consequence of a small footprint; making precise or intended control of the actionable object 15 difficult in a native, attachmentless state.

Figure 2A:
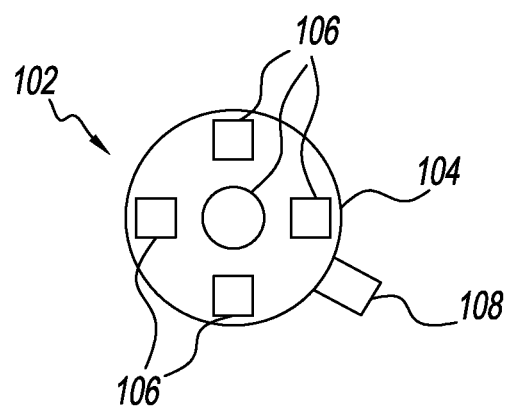
FIG. 2A illustrates a touchscreen-controller attachment, according to an embodiment.
Figure 2B:
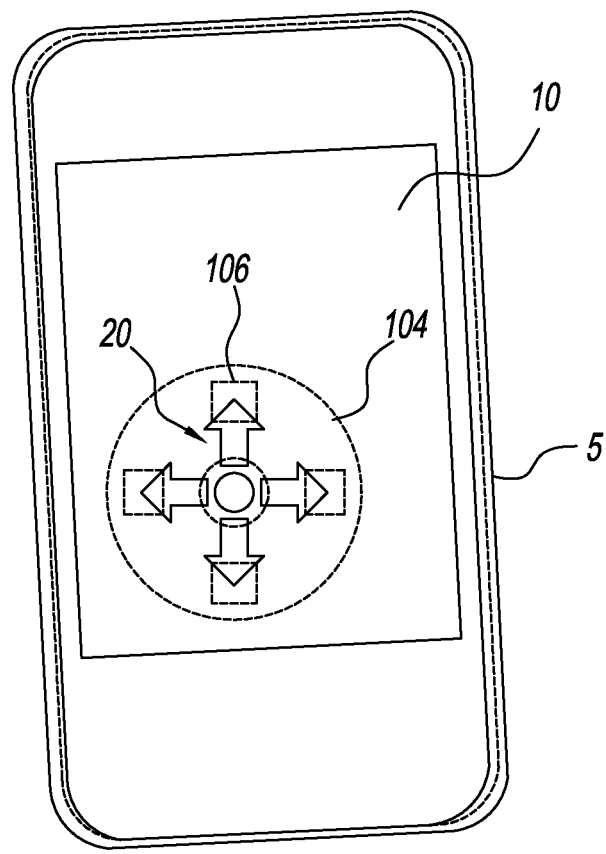
FIG. 2B illustrates a touchscreen-controller attachment conductively affixed to the soft keys or soft buttons of a touchscreen, according to an embodiment.

FIG. 2A illustrates a touchscreen-controller attachment 102, according to an embodiment. FIG. 2B illustrates a touchscreen-controller attachment 102 with the respective conductive elements 106 conductively affixed to the soft keys or soft buttons 20 of a touchscreen 10, according to an embodiment. Some elements of FIG. 2A may not be reproduced in FIG. 2B since contactual overlay is the elementary focus.

A touchscreen-controller attachment 102 comprises an attachment base 104 containing a conductive element 106 or plurality of conductive elements 106. The conductive elements 106 may be made of any electrically-conductive material or materials, including but not limited to, conductive polymers such as polyaniline, conductive gels, conductive liquids, conductive wire, any material that is conductively (exhibiting conductivity) coated—such as with the use of treated and/or dipped foam, thread, or fibers—used alone, in filler compositions or in a series of conductive combinations, as aptly conjoined. The material of the conductive elements 106 are preferably chosen and/or shielded to be non-abrasive to the touchscreen 10.

Excluding the housed conductive elements 106, the touchscreen-controller attachment 102 is comprised of a non-conductive material or materials, such as plastic or rubber. The back, screen or "attachment" side of the touchscreen-controller attachment 102 is designed to be affixed to the touchscreen 10, with the touchscreen-controller attachment's 102 opposing face, (the actuating or "user" side) accessible by a user of the user device 5. The conductive elements 106 are designed for contact with the soft buttons 20 (see FIG. 1 and FIG. 2B) from the attachment side and see the element's conductive path extended, respectively, to an accessible position of touch input on the actuating or "user" side of the user device 5.

The attachment base 104 may be affixed to the touchscreen 10 by suction, static, removable adhesive backing or any other appropriate means. A removal tab 108 provides for removal of the attachment base 104 from the touchscreen 10.

As illustrated in FIG. 2B, the touchscreen-controller attachment 102 is attached in a manner such that the conductive elements 106 are in contactual and respective alignment with the soft buttons 20 displayed on the touchscreen 10. This alignment permits the capacitive load or capacitance stored, for example, in the user's finger (which is also an electrical conductor) to be conveyed through the conductive elements 106 upon touch at the "input" end and thus alter the amount of charge at the corresponding "output" end seeing touchscreen 10 contact, just as if the user was directly touching the soft-buttons 20 of a touchscreen 10 by the instrumentality of finger or touch input. Said contact may then be interpreted by both the processor and software of the device and relayed, accordingly, to engage control of an actionable object 15. A conductive path thus "extends" the soft buttons 20 of the touchscreen 10 to the entirety of the conductive elements 106. In this way, the touchscreen-controller attachment 102 can offer the user a vastly improved, more refined means of controlling a controllable or actionable object 15 over its "native", attachmentless state.

In contrast with direct finger contact with the soft buttons 20, the touchscreen-controller attachment 102 provides for a physical interface—that can be scalable—assisting the user in tactile reference of a touchscreen's 10 "button geography". Such tactile reference could prove quite advantageous in yielding more precise control, comfort, convenience and a greater parallel to familiarity of habit with an interface that may borrow certain physical expression or expressions from traditional control structures of video-game consoles, amongst other advantages. The touchscreen-controller attachment 102, in tactile elaboration, provides a physical reference point that reduces a user's need for visual confirmation of the location of the soft buttons 20. With traditional, standalone soft-button controllers in action, as a case in point, visual confirmation may be required when a user's finger has slipped, from the soft buttons 20 or fails to actuate a soft-button through misplacement and a loss in finger orientation ensues. In an active gaming environment, for example, with dynamic and rapidly-evolving control-structure requirements facing the user, such miscues can be all too common.

The touchscreen-controller attachment 102 is sufficiently wide and long to ensure that the soft-buttons 20 are aligned with the conductive elements 106, but not overly wide and long to otherwise block or encroach germane domain of the actual screen as an application or actionable element is being rendered. Graphical encroachment beyond the soft-buttons 20 may occur, when such encroachment is not deemed critically invasive to the application. The conductive elements 106 are proportionate to the soft buttons 20 on the touchscreen 10 and also the respective hardware ensemble on which it is intended to operate and sit contactually affixed to the intended soft button and not an unintended plurality, unless specifically designed for such a purpose.

While a single touchscreen-controller attachment 102 is illustrated in FIG. 2B, this is not suggestive of quantitative limitation. In an embodiment, a plurality of touchscreen-controller attachments of varying sizes, shapes, configurations and component dimensions may be simultaneously affixed to a touchscreen 10, in the spirit and scope of this discourse, should control scenarios of an actionable object 15 or objects require it.

Figure 3A:
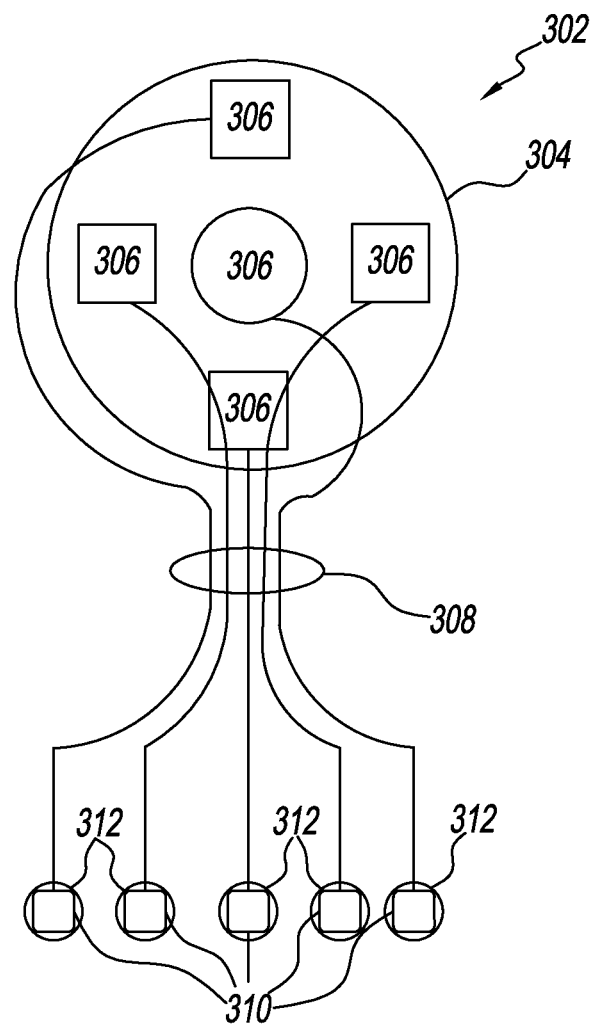
FIG. 3A illustrates an unattached controller assembly, designed for remote operation, according to an embodiment.

FIG. 3A illustrates an unattached touchscreen-controller assembly, designed for remote operation, according to an embodiment.

A remote actionable-object controller assembly 302 comprises a remote actionable-object controller interface 304, connecting cable 308 and a plurality of conductive elements 310 and 306; each of the conductive elements 310 is individually attached, ensuring a chain-of-conductivity or conductive path remains present, to a conductive extension such as a wire filament. The connecting cable 308 collectively houses the attached wire filaments for each of the conductive elements 310, with care to ensure each individual wire is properly insulated from each other to prevent conductive "bleed-through" between the competing filaments (subject to contact) housed in the connecting cable 308.

Reciprocally, each of the conductive elements 306 in the remote actionable-object controller interface 304, is individually attached, ensuring a conductive path remains present, to the opposite end of the respective wire filament originally extended from a conductive element 310 and described above. Thus, a conductive path remains throughout the respectively tethered conductive elements 306 and 310 via a wire filament connection.

The conductive elements 306 and 310 may be made of any electrically-conductive material or combination of conductive materials, including but not limited to, conducting polymers such as polyaniline, conductive gels, conductive liquids, conductive inks, conductive wire and/or any material that is conductively (exhibiting conductivity) dipped and/or coated—such as with the use of treated foam, thread, or fibers—used alone, in filler compositions or in a series of conductive combinations, as aptly conjoined to ensure a proper conductive path remains present. Excluding the housed conductive elements 306, the remote actionable-object controller interface 304 is constructed of a non-conductive material, such as plastic or rubber.

A substantial length of each wire filament remains housed in the connecting cable 308; the exception being the attachable ends of a wire filament, thus helping promote attachment and attachment flexibility. The conductive element 310 is married to the contact base 312 by any means appropriate, with care to ensure a proper conductive path to the touchscreen 10 remains throughout. The contact base 312, containing either a conductive component or constructed from a conductive material in its entirety, is designed to sit conductively affixed to the soft buttons 20 (not illustrated).

Figure 3B:
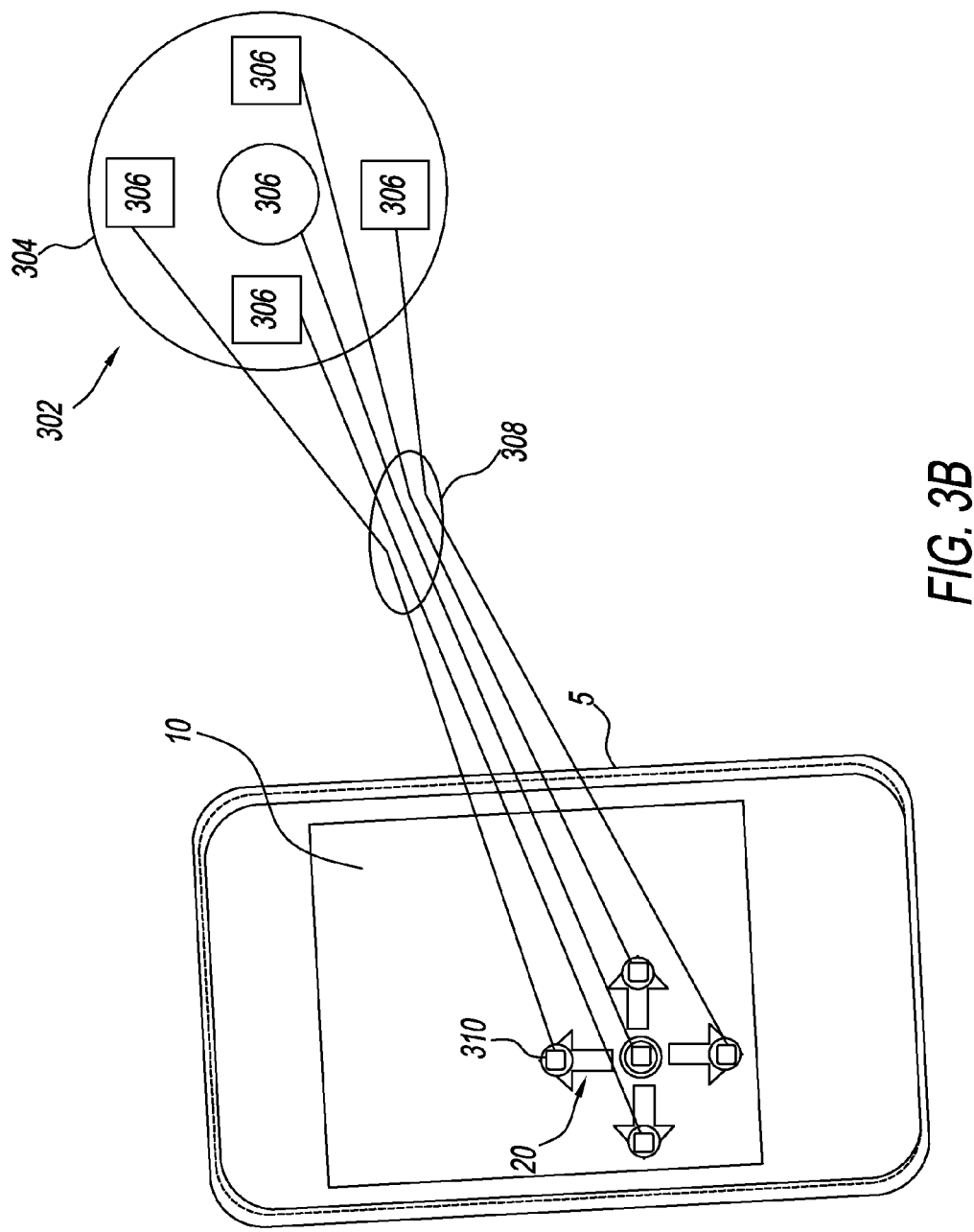
FIG. 3B illustrates a controller assembly designed for remote operation; conductively married by attachment to the soft buttons or keys of a touchscreen, according to an embodiment. (See also FIGS. 10A, 10B)

FIG. 3B illustrates the touchscreen-controller assembly 302 outlined in FIG. 3A, delineating how it is conductively married—by attachment—to the respective soft buttons 20 of a touchscreen 10; thus permitting remote operation, according to an embodiment.

Each conductive element 306 of the remote actionable-object controller interface 304 is assigned to a correlative soft button 20. For instance, according to position, the top conductive element 306 on the remote actionable-object controller interface 304, will see the conductive path completed when it is positioned in contact with the top soft button 20. The conductive element corresponding to the right-most conductive element 306 sees its conductive path extended to the right-most soft button 20, and so on, until each respective soft button 20 is properly accounted for and properly synchronized for intended navigation.

Each conductive element 310 is proportionate to the touchscreen 10 environment in which it is intended to operate. Each conductive element 318 is sized with care to ensure each does not block or encroach germane domain of the actual screen as the application is being rendered and/or unintentionally overlap a plurality of soft buttons 20, upon attachment to its correlative counterpart. One or more of the conductive elements 310 (including all attachment housing) may be transparent or translucent, minimizing any loss of view due to placement of the conductive elements. Colour coding may be used to simplify deployment of the controller assembly, amongst other means.

Citing an example of a capacitive touchscreen 10, two electrically conductive objects, in this case a user's finger and the metal electrodes underneath the surface of a capacitive touchscreen, are brought in close proximity—without actually touching. When a user's finger contacts the glass of a specially-equipped touchscreen 10, a tiny instance of capacitance is created between these two electrically conductive objects. This instance of capacitance is cooperatively interpreted by both the processor and software running on the user device 5, thereby translating this touch into directives; such as when attempting control of an actionable object 15. Touching the conductive elements 306 of the remote actionable-object controller interface 304, is detected by the touchscreen 10 in the same way as directly touching the soft buttons 20 on the touchscreen 10 itself, making remote operation from a capacitive-touchscreen device possible through extension of any requisite conductive path(s).

Although not illustrated, the remote actionable-object controller assembly 302 can comprise a current-boosting device that is designed to, for example, intercept, then boost the induced capacitance engaged by finger contact with the conductive elements 306, before it is relayed to the touchscreen 10 in order to complete the conductive path. Such use of an amplifier device may be necessary under certain remote-operating scenarios.

Furthermore, a haptic embodiment marrying an adapted remote actionable-object controller interface 304 with an actuator, such as a single or series of vibratory motors and a vibration-coupling device, in a hand-held device to form a haptic controller—also not illustrated—is presented. The haptic controller provides force or tactile feedback to a user, commonly in the form of a vibration reflex to touch. Vibration-feedback is dependent on governing software, such as with the game play or activity of compatible-gaming titles relaying haptic directives from the user device 5 to a haptic controller. In a game environment, force feedback can be used to register events like bumps, crashes and player damage. A vibration-coupling device acts as an intermediary relay to the vibratory motors of a haptic controller, after first receiving "haptic" or signal directives from the user device 5, in one haptic embodiment, or alternatively, a separate intermediary-transceiving device (See FIG. 9 for related discussion) may act as the synchronizing relay agent of haptic directives from a user device 5 to a haptic controller.

Components involved in the relay of haptic directives can be suitably equipped for a full wireless complement, although this does not preclude use of a "wired" constituent and/or substitute. For instance, A haptic controller with innate conductive elements 306 designed to capacitively engage control of an actionable object 15, in the spirit and scope of this discourse, can see a conductive path to a touchscreen 5 completed through use of a wire filament. Haptic directives may also be communicated using near-field communications (NFC) with, for example, a NFC-equipped mountable intermediary-transceiving device (not shown here, please refer to FIG. 9 for related discussion) designed to station—and haptically-interact with—a user device 5. The use of NFC in this embodiment is not suggestive of limitation to this particular example.

The haptic controller may be powered by a controller battery or plurality of batteries, a power receptacle and/or any ether suitable power source. Dimensions of this embodiment are proportionate in size to the hardware in which it is linked. Although haptic feedback seeks to take advantage of a user's sense of touch, this embodiment is not suggestive of limitation and may be modified to wholly embrace the future of all sensory-involvement devices, including those beyond the sense of touch. Modifications to this embodiment will also occur as haptic technology evolves and a new wave of highly-sophisticated haptic interfaces surface, such as with the possible inclusions of haptic radar, haptic teleoperation, force-feedback RFID and virtual drums and with the evolution of nano-technology interfaces.

The conductive elements 106 illustrated in FIGS. 2A and 2B and as elements 306 and 310 in FIGS. 3A and 3B, and throughout this discourse, may be formed from an absorbent material, shaped to a desired dimension, which is then dipped in a conductive liquid, such as water or a saline solution and packaged in an airtight container (sometimes referred to herein as a "cocoon"). Said container may be fabricated from a thin, flexible plastic material to prevent evaporation of the electrical conductor. The plastic used in this "cocoon" is sufficiently thin to ensure a conductive path remains amongst the conductive elements 106, 306, 310 and the respective soft buttons 20 upon application. The absorbent material selected for the conductive elements 106, 306, 310 may be soft and compressive in nature, as to simulate the feel and physical expression of "button-pressing" of larger, console-based game controllers. The cocoon may also be filled exclusively with a conducting liquid, amongst a broad scope of alternative deployments, to aptly fulfil the requirement(s) of a conductive path.

Figure 4A:
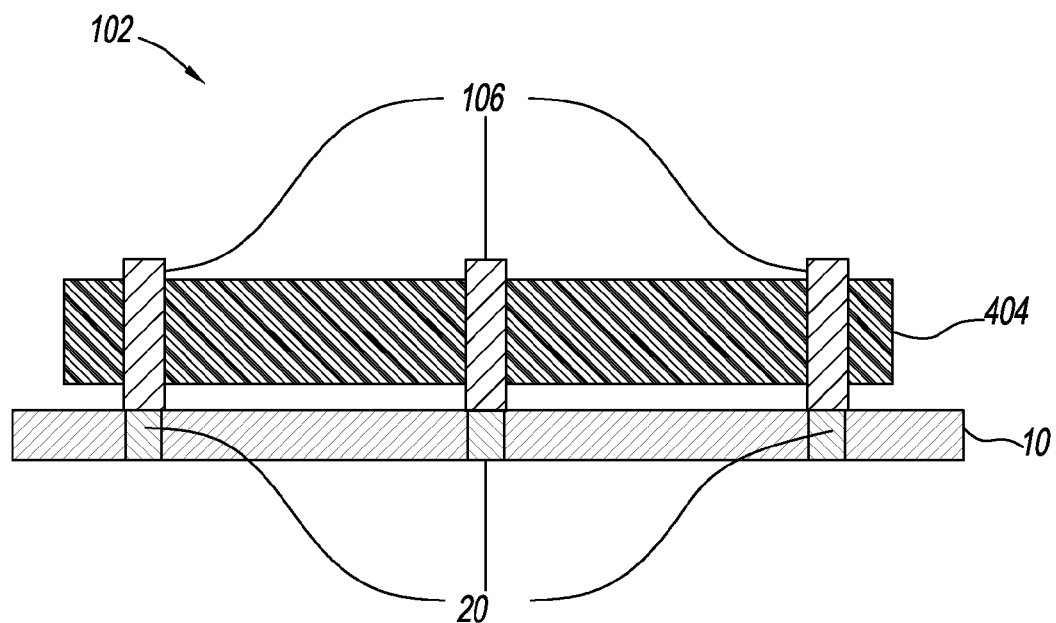
FIG. 4A illustrates a simplified, cross-sectioned side view of an attachable-controller assembly, as affixed, respectively, to the touchscreen, with the correlative conductive elements in constant contact with the touchscreen, according to an embodiment.

FIG. 4A illustrates a simplified, cross-sectioned side view of certain components of a touchscreen-controller attachment 102 (See FIGS. 2A, 2B and related discussions), as affixed, respectively, to the touchscreen 10; with the conductive-elements 106 sitting in a position of constant contact with the touchscreen 10 and the correlative soft navigator buttons 20, according to an embodiment. To engage control functionality a person must simply touch the conductive elements 106 using the control input of a finger.

Figure 4B:
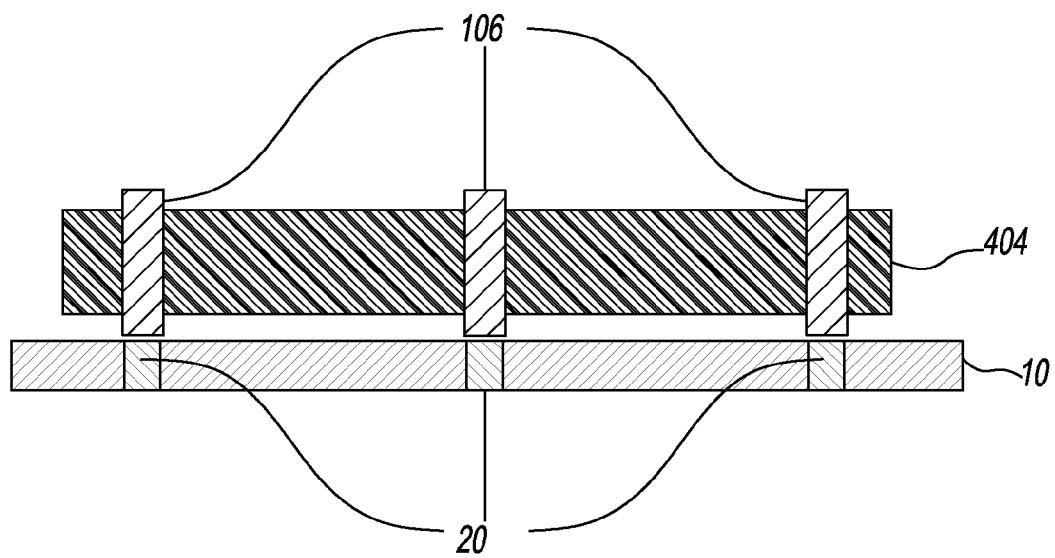
FIG. 4B illustrates a simplified, cross-sectioned side view of an attachable-controller assembly, as affixed, respectively, to the touchscreen, with the correlative conductive elements disengaged from the touchscreen at rest, according to an embodiment.

FIG. 4B illustrates a simplified, cross-sectioned side view of certain components of an alternate implementation of a touchscreen-controller attachment 102 (See FIG. 4A), as affixed, respectively, to the touchscreen 10. In contrast to FIG. 4A, the correlative conductive elements 106 are disengaged from the touchscreen 10 at rest, according to an embodiment. To engage control functionality of a capacitive touchscreen under this system, the user employs the control input of a finger or thumb to both touch and concurrently depress the conductive elements 106 until the bottom surface of the conductive elements 106 make contact with the touch-sensitive soft buttons 20. The amount of pressure that is required to actuate the conductive element 106 to a state of contact with the touchscreen 10 can depend on the flexibility of the attachment base 404 and the distance between a conductive element 106 at rest and the touchscreen 10, among other factors. Once finger pressure is removed from the conductive element 106, the conductive element 106 will ideally revert back to its original position of rest (in non-contact mode). A spring-mounted conductive element can also be implemented for such reversion. (See FIG. 5)

This resulting range of motion helps more closely simulate the "button behavior" of buttons found on traditional game controllers, game pads and/or other such control or navigation devices of gaming consoles. Aside from migration to more "button-like" action, this system may help prevent unintentional "button bleed" that can arise from such scenarios as slippage and/or incidental finger contact with competing conductive elements 106, since the user must not only contact, but also depress the conductive elements 106 to a degree of touchscreen 10 contact to be engaged. This design, for instance, may prove useful for soft-button 20 controller renderings where spacing between the set of independent buttons is diminutive and thus, prone to "button bleed".

The conductive elements 106 are proportionate in size to the hardware in which it is intended to operate and care is directed to ensure dimensions of the conductive elements 106 are not excessive. Overly long conductive elements 106, for example, can help create undue stress or pressure on the naturally fragile-touchscreen 10 glass when firm, downward finger pressure is applied by the user. To help safeguard the touchscreen 10, a range-restrictive shield that surrounds the protruding conductive elements 106 at the position of user input, among other means, can be applied. This range-restrictive shield is a physical barrier that prevents the conductive elements 106 from pressing too hard against the surface of touchscreen 10 and damaging it, and may be similar to a backstop 14 shown in FIG. 5.

Figure 5:
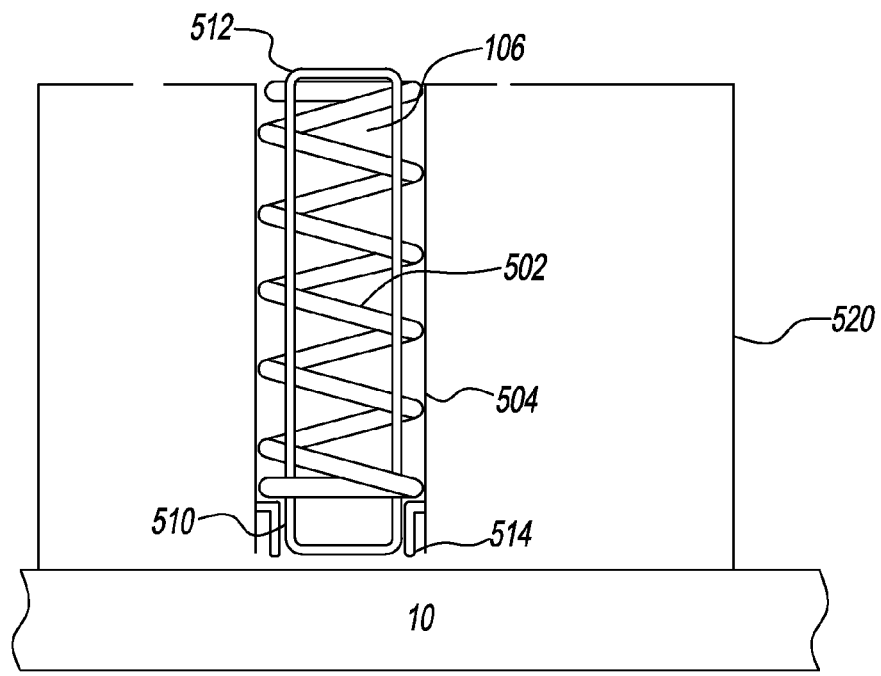
FIG. 5 illustrates a cross-sectional view of a touchscreen-controller attachment, with a single, spring-mounted conductive element, according to an embodiment.

FIG. 5 illustrates a cross-sectional view of a touchscreen-controller attachment, featuring a single, spring-mounted conductive element, according to an embodiment. A cylindrically-tethered compression spring 502 resides in a spring chamber 504 located in the attachment base 520. The cylindrically-tethered compression spring 502 can embrace a substantial length of the conductive elements 106, with a measured allotment of the top and bottom regions of the conductive elements 106 sitting free from the coil wrap of the compression spring 502. The design impetus being to permit fluency of motion for the bottom region 510 of the conductive element 106 in making contact with the touchscreen 10—when the upper region 512 of the conductive element 106 is both touched and concurrently depressed—without risk of harming the surface of the touchscreen 10 from coil abrasion. Accordingly, the cylindrically-tethered compression spring 502 returns to its original position of rest (noncontactual mode of the conductive elements 106) when the downward pressure is removed.

The compression spring 502 is secured by a backstop 514 near the bottom of a spring chamber 504. The backstop 514 may be a circular lip that extends slightly beyond the circumference of the spring for proper anchoring and is not excessively wide that it interferes with the fluency of movement of the conductive element 106 as they are engaged. The conductive element 106 may be of varying heights and dimensions; the determinants of which can be dictated by criteria such as the size and orientation of the touchscreen-controller attachment 10, touchscreen 10 and soft buttons 20. The diameter of the upper region 512 of the conductive element 106 protruding beyond the coil wrap, may be fashioned wider (not illustrated) than the portion that passes through the compression spring 502, if covered, for improved contact with the tip of a finger or thumb.

Figure 6:
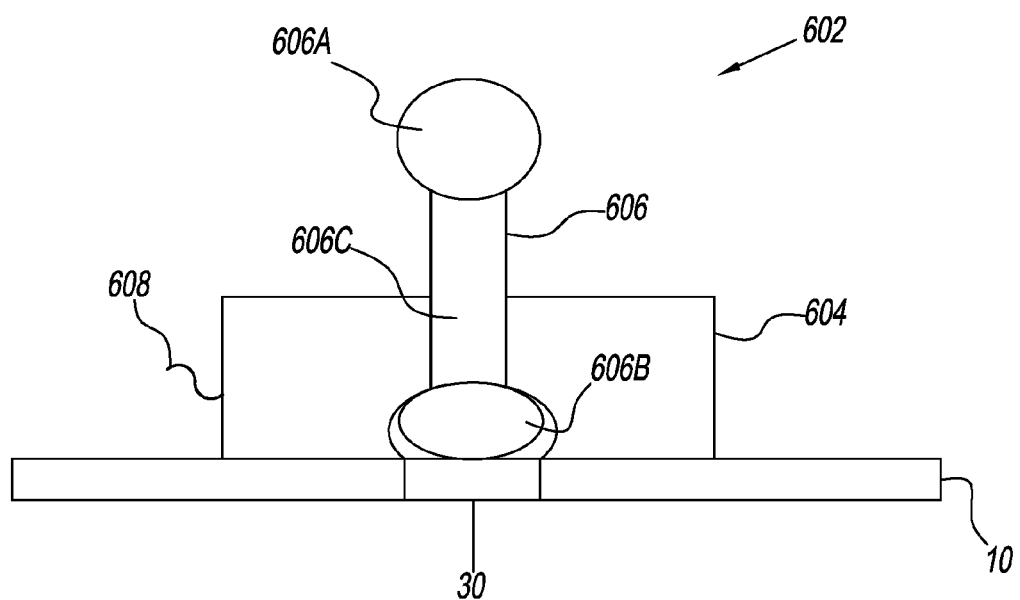
FIG. 6 illustrates a touchscreen-controller attachment, borrowing in expression from a traditional joystick controller, primarily through its shaft design and curvilineal conductive top, according to an embodiment.

FIG. 6 illustrates a touchscreen-controller attachment 602, borrowing in certain characteristic expressions from a traditional joystick controller, such as through its shaft design, motion behavior and graspable tip (in this case a curvilinear conductive top mimics the physical expression found on some traditional joystick controllers, although this language is not intended to be limiting), this according to an embodiment. The soft button or buttons 20 (FIG. 1) are represented as a "soft orb" 30 and control of an actionable object 15 (FIG. 1) or player is effected by dragging the soft orb 30 in a 360 degree range of motion. A conductive element is fashioned into a stick controller 606 comprising a top portion 606A, center portion 606C and bottom portion 606B. The top portion 606A may take the shape of a knob, amongst other designs, to furnish grip comfort or remain "knobless", while the bottom portion 606B acts as an actuating base designed to maintain constant contact with the soft orb 30—displayed on the touchscreen 10—during a full range of motions. The center portion 606C represents the shaft and may exhibit a diameter less than that of the corresponding knob or base. The bottom portion 606B may be any of a number of different shapes, for example: a straight shaft with no bulge or a spheroid design or other bulge.

As understood by those skilled in the art, a joystick controller attachment in the spirit and scope of this embodiment may require appropriate electronic translation of movement; since stick-controller gestures can translate to the soft orb 30 on a touchscreen 10 in a reverse manner to those gestured. Anticipatory software can quarterback this "electronic translation" and can be programmed to work in collaboration with such controllers at the source, such as with the game developers. Where complimentary software is not situated, design modifications can be implemented (not shown) to include gesture-reversing components innate to the controller. The impetus of any joystick-configuration measure is to effect appropriate actuation to all desired movements, whereas an "upward" movement of the joystick, for instance, will result in an "upward" or reciprocal movement of a controllable or actionable object 15 on a user device 5.

The conductive stick-controller element 606 is housed in an attachment base 604, which facilitates the conductive stick-controller element's 606 directional and rotational movements and acts to simulate the "feel" of a traditional stick controller by controlling both stabilization and gesture fluency. The attachment base 604 may be affixed to the touchscreen 10 by suction, static, removable adhesive backing or any other appropriate means. A removal tab 608 provides for removal of the attachment base 604 from the touchscreen 10.

Figure 7:
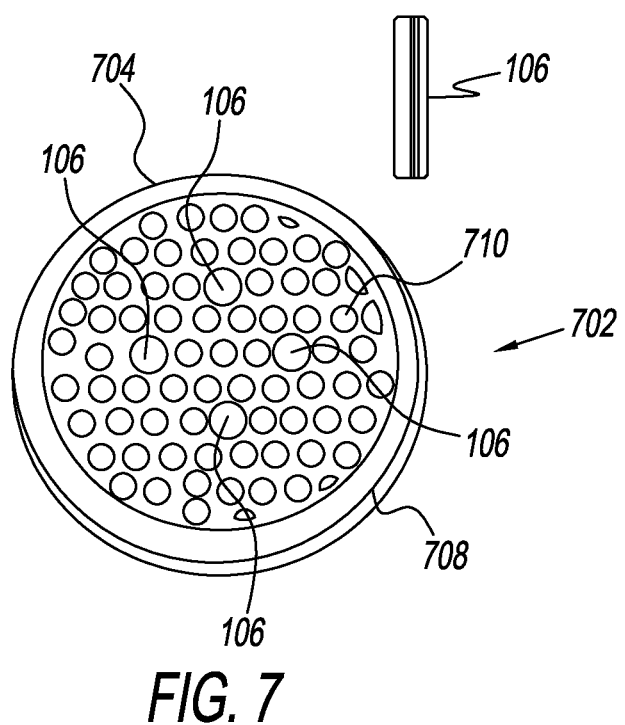
FIG. 7 is yet another embodiment of the touchscreen-controller attachment, featuring a customizable navigation-control system, according to an embodiment.

FIG. 7 illustrates yet another embodiment of the touchscreen-controller attachment 702, featuring a customizable navigation-control system. A touchscreen-controller attachment 702 comprises an attachment or controller base 704. The attachment base 704 comprises a plurality of channels 710 for receiving conductive elements 106. The touchscreen-controller attachment 702 may be oriented on the surface of the touchscreen 10 prior to attachment, such that a congruous plurality of channels 710 align with the totality of the soft buttons 20 (FIG. 1) displayed on the touchscreen 10. Upon attachment, a conductive element 106 is inserted into a channel or channels 710 aligned with the soft buttons 20 (FIG. 1) to a point of conductive contact, thereby causing the soft buttons 20 (FIG. 1) to be actionable from a customizable physical interface that sits attached to the touchscreen 10. A transposable configuration apropos to the specific needs of the displayed controller geography is present. This may make possible the use of a single, comprehensive touchscreen-controller attachment 702 per software event without the need for a prefabricated set or plurality of stand-alone, touchscreen-controller attachments (each potentially with widely varying placement of its conductive elements 106) that may be required by a user, for example, with a library of gaming titles. Such configuration virtue may lead to a more ubiquitous attachment.

By way of illustration and not by way of limitation, the highly-configurable attachment base 704 may be implemented as a circular disc, containing a plurality of channels 710 that are arranged in a gridded fashion across the attachment base 704. The attachment base 704 may be circumscribed by a flexible ring 708. The flexible ring 708 may contain a lower lip exterior that may be affixed through suction, static, removable adhesive backing or any appropriate means to the touchscreen 10 (FIG. 1, reference 10) allowing each channel 710 and its respective inserted conductive element 106 to oscillate through directional finger, thumb or individual touch contact; thus adding further flexibility and customization capabilities to the embodiment's control disposition. In other words, each channel and respective conductive element 106 has some flexibility of movement, such that it can be gestured some small translational distance in any direction in order to best match up with the touchscreen 10 and the control disposition of its soft navigational buttons 20, where necessary.

Figure 8A:
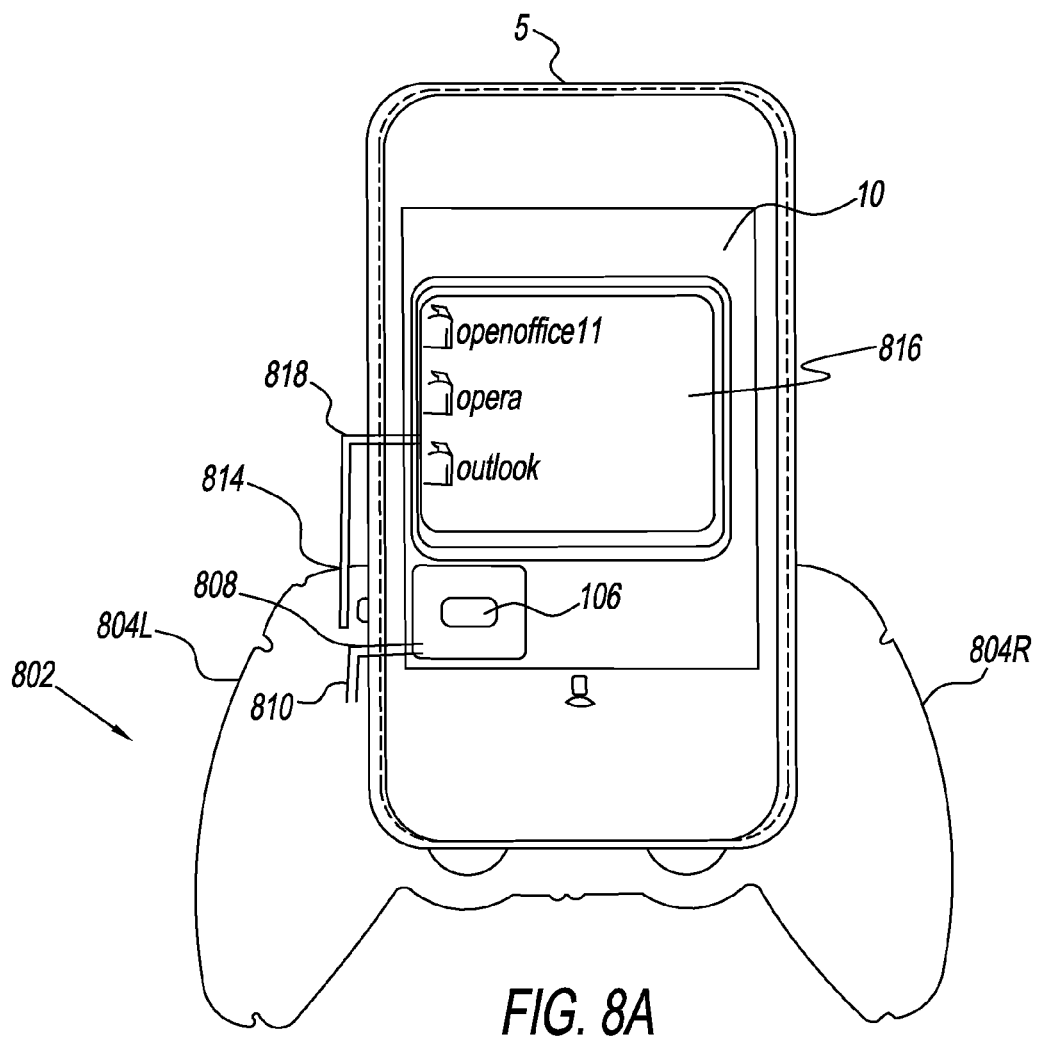
FIG. 8A illustrates a user-device suspension apparatus, according to an embodiment.
Figure 8B:
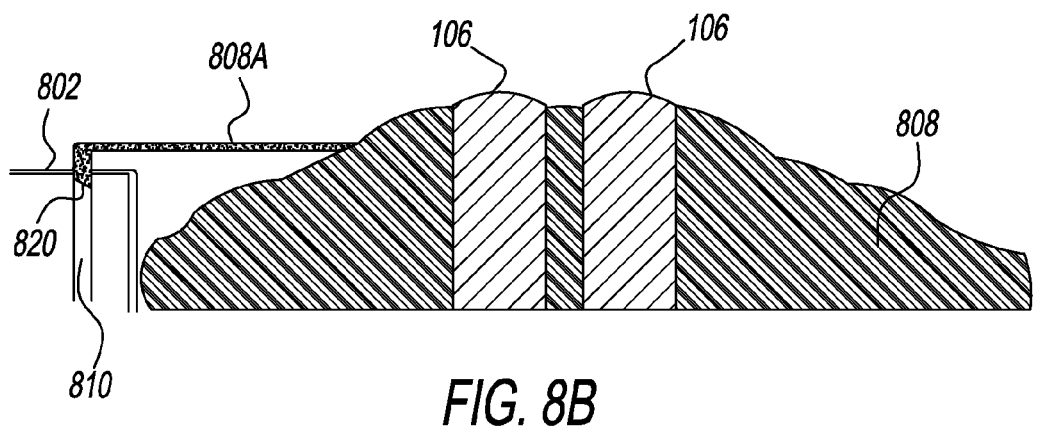
FIG. 8B is a cross-sectional view illustrating the elements of a controller attachment as it is attached to, through an adjustable stem, a receptive suspension device, according to an embodiment.

FIG. 8A illustrates a user-device suspension apparatus and related controller attachment, according to an embodiment. FIG. 8B is a cross-sectional view illustrating elements of a controller attachment, as it is attached, through an adjustable stem, to a user-device suspension apparatus, according to an embodiment.

A suspension device 802 secures a user device 5 and anchors a touchscreen-controller attachment with adjustable stem 808, according to an embodiment. The graspable or handle ends of the suspension device 802 may be molded to the contours of the hand, with rubberized grips, to facilitate gripping and hand comfort. The grippable components may be similar to those of a traditional video-game console, controller and thus, help provide the user with a more familiar tactile experience. "Pocket gamers" seeking a more "clutch-friendly" stead may likely prefer a controller that allows for better grip mechanics and button logistics than the more limited stead of the direct clutch of a user device 5. This may be particularly evident in such situations where the gamer is not looking directly at the controller and may be engaged in rapid and dynamic manipulation of the soft-button controller; such conditions which can easily cause the user device 5 to, for example, become momentarily or partially dislodged from the user's grasp and/or see a user's oriented touch input wander.

The suspension device 802 comprises a left-core assembly 804L and a right-core assembly 804R. The left-core-assembly 804L and the right-core assembly 804R may be joined by an adjustable or fixed strip (not illustrated) or fabricated from a single component. The left-core assembly 804L and the right-core assembly 804R, using laterally positioned inner tracks or channels (not illustrated), may snap or slide into position along the respective sides of the user device 5. A purpose of the channels contained in the left-core assembly 804L and the right-core assembly 804R can be to guide and lock the user device 5 at the centre of the suspension device 802, whilst maintaining fluent viewing of its touchscreen 10. The left-core assembly 804L and the right-core assembly 804R can also accommodate the anchoring of—and furnish accessibility to—an attached touchscreen-controller attachment with adjustable stem 808 or a respective attachment plurality.

The face of the suspension device 802 contains a frontal-slotted groove 810 that accommodates the touchscreen-controller attachment with adjustable (interchangeable) stem 808; the adjustable or interchangeable stem substantially permitting varying placement of the base of the touchscreen controller attachment with adjustable stem 808 on the touchscreen 10, for proper control syncing amongst varying scenarios. The suspension device 802 may contain a plurality of frontal-slotted grooves 810 to accommodate additional touchscreen-controller attachments with adjustable stems 808, if warranted. The touchscreen-controller attachment with stem 808 may house one or more conductive elements 106 designed to capacitively engage (such engagement is not a focus of this illustration) the soft buttons (FIG. 1, reference 20) on the touchscreen 10; thereby providing the ability to engage control of an actionable object 15 from a mounted, attachable interface, as it sits attached to a stead-friendly suspension device 802, in the spirit and scope of this discourse.

The suspension device 802 may include one or more threaded-attachment apertures 814 that can act to suspend accessories such as an eye-friendly magnification device 816; which can readily be positioned to magnify a pocket-sized touchscreen 10 as, exempli gratia, a game or an application is being rendered or a webpage or e-book is being read. The magnification device 816 may cover all or a portion of the touchscreen 10. The magnification device 816 may be mounted to a threaded attachment aperture 814 by an elbow 818. The elbow 818 may be fixed or configured to pivot and/or be manually directed for positioning flexibility. The magnification device 816 may be permanently attached or may be removable. The components of a suspension device 802 are ideally scaled to the proportions of the user device 5 to which it is linked.

The adjustable stem 808A (FIG. 8B) may contain a variable locking head 820 designed to sit securely into the frontal slotted groove 810. The frontal-slotted groove 810 may be incised in varying shapes and dimensions; catering to any variance in design of the locking head 820. The adjustable stem 808A may be constructed of a rigid or yielding material—the latter tending to retain its position until it is manually altered from its position of rest, to facilitate adjustment capabilities of the touchscreen-controller attachment with adjustable stem 808 across a wide range of the touchscreen 10. In this way, the conductive elements 106 have enhanced positional flexibility under a manually-altered configuration. Touchscreen attachment protocol may detail suction, static, removable adhesive backing or any other appropriate means.

Figure 9:
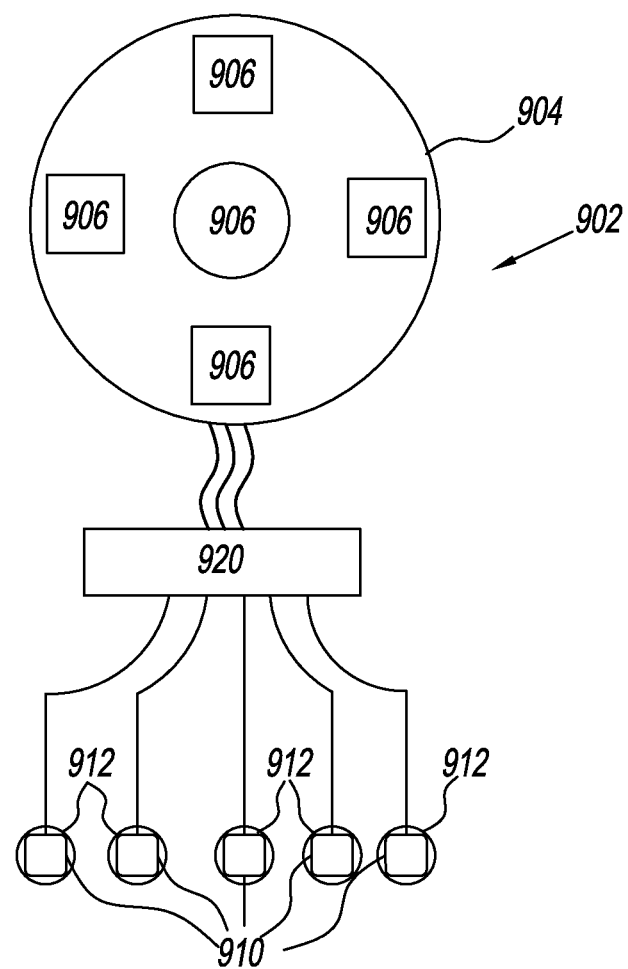
FIG. 9 illustrates a touchscreen-controller assembly designed for remote operation; with a wireless component, according to an embodiment.

FIG. 9 illustrates a touchscreen-controller assembly with a wireless component; an assembly designed for remote operation, according to an embodiment. A wireless controller 904 is paired to an intermediary-transceiving device 920 using short length radio waves or radio frequency, microwave, infrared communication, near-field communications (NFC) or any other wireless technologies, in order to engage control of an actionable object 15 or player, in the spirit and scope of this discourse. The intermediary-transceiving device 920 acts as a relay between the soft buttons 20 on a touchscreen 10 and the command signals of a wireless controller 904. The intermediary-transceiving device 920 may be constructed to draw from an internal power source, such as from the holdings of an internal battery compartment, or from an external source such as an electrical receptacle outlet, reducing the potential draw on the user device 5. The assembly may also be constructed to optionally use the power source of the user device 5, at the user's discretion.

The intermediary-transceiving device 920 contains a single or plurality of tethered conductive elements 910 for attachment to the soft buttons 20 of a touchscreen 10. The conductive elements 910 may be formed from any conductive material or combination of materials including, but not limited to, conductive polymers such as polyaniline, conductive gels, conductive liquids, conductive plastics, metallic or conductive wire, or any material that is conductively (exhibiting conductivity) coated—such as with the use of treated or dipped foam, thread, or fibers—used alone, in filler compositions or in a series of conductive combinations, as aptly conjoined.

As it is engaged, a wireless controller 904 sends control or navigation commands to an intermediary-transceiving device 920 for processing, thereby causing the respective conductive elements 910, attached to the intermediary-transceiving device 920, to be engaged accordingly.

The intermediary-transceiving device 920 contains an innate capacitive source and capacitive manager, thereby delivering the ability to engage a conductive element 910 or plurality of elements 910—by drawing from this innate capacitive source and managing its "transfer" to a respective conductive element 910 counterpart; in a manner faithful with the command gestures of the wireless controller 904. This, without the need of actual direct finger contact with the conductive elements 910 by the user. Said another way, the intermediary-transceiving device 920 precisely marries the control gestures of the wireless controller 904 with the reciprocal physical conductive elements 910, thereby engaging control of an actionable object 15 or player in the exact manner and order in which the command is sent by the wireless controller. With emphasis, a system has been delineated where conductive engagement is not dependent on the user's finger being an electrical conductor and initiating touch (the control input of a finger) with the touchscreen 10. The touchscreen 10 responds to these wirelessly conveyed signals as an innate capacitive source is induced by the intermediary-transceiving device 920 and then respectively relayed to the touchscreen 10; just as it would to direct touchscreen 10 contact from the control input of a user's finger (which is no longer requisite, as per this embodiment). A hybrid system utilizing both wired and wireless aspects is illustrated, although use of a hybrid system in this example is not intended to be limiting.

Other embodiments described or addressed herein, or ones that otherwise become obvious to a person of skill in the art upon reading this application, may similarly be adapted for wireless use through, for instance, the introduction of an intermediary-transceiving device 920 to an embodiment or embodiments lacking such a device. Introduction of an intermediary-transceiving device 920 may offer certain embodiments the potential to become wholly "wire free" since the transceiver can communicate directly with both the user device 5 and any specially-designed hand-held controller device, or potentially offer a user the underpinning of "less wires" in a hybrid system, where available. NFC technologies can also further permeate itself, where applicable, beyond those embodiments in which the technology itself receives mention. Certain proximal touchscreen 10 attachment-controller interfaces, for instance, may employ the technology in control directives as the initiator or target. In some instances, the addition of a servomechanism or the like may also be introduced to manage certain gestures or motions, such as with trackball rotation.

Figure 10A:
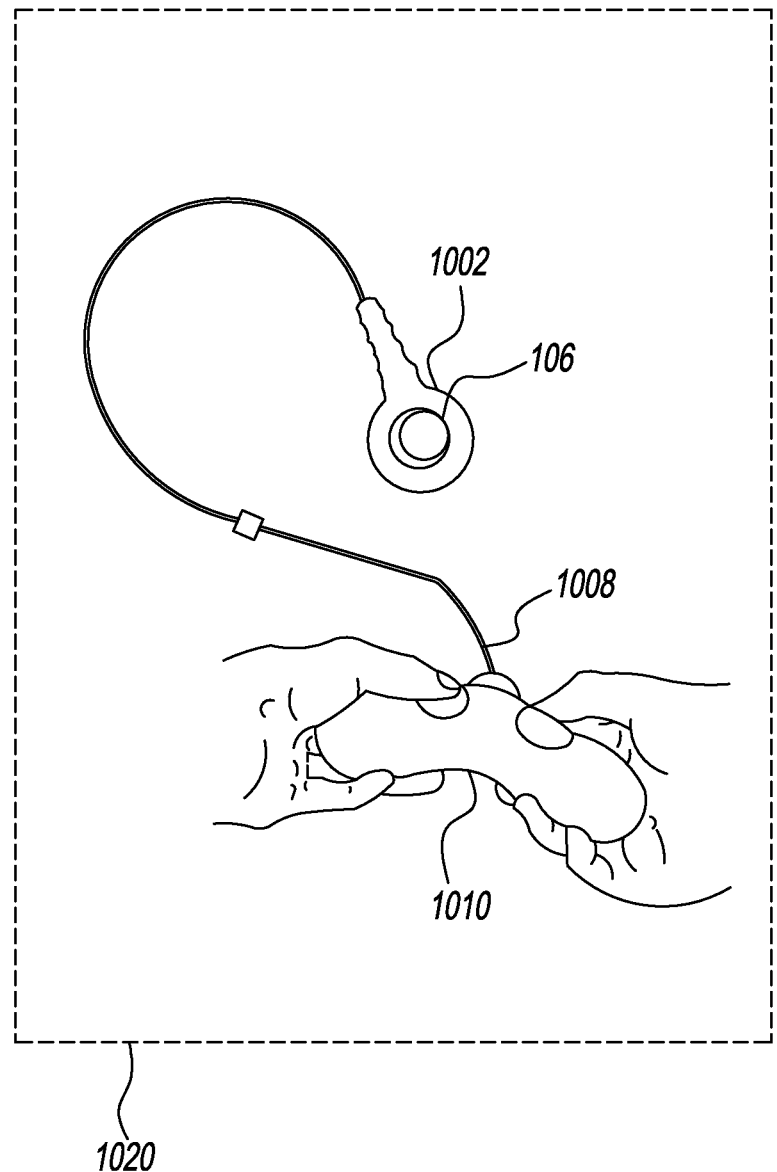
FIGS. 10A and 10B illustrate a touchscreen-controller assembly, designed for remote operation, according to an embodiment.
Figure 10B:
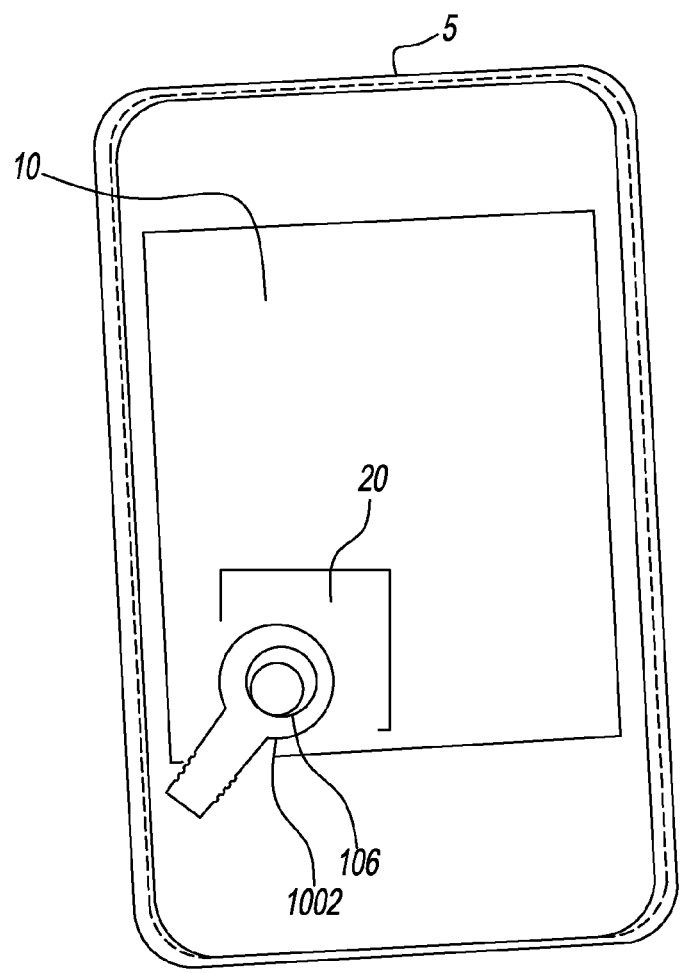

FIGS. 10A and 10B illustrate a touchscreen-controller assembly, designed for remote operation, according to an embodiment. See also FIGS. 3A, 3B.

By way of illustration and not by way of limitation, each tip (or element in its entirety) of the conductive elements 106 may comprise a liquid conductor—fully enclosed in an air-tight, plastic-wrap seal 1002—designed for attachment to (and detachment from) the soft-buttons 20 of a touchscreen 10 on a user device 5, as illustrated in FIG. 10B. Each tip of the conductive elements 106 may be affixed to the touchscreen 10 by suction, static, removable adhesive backing or any other appropriate means, individually or collectively through attachment-plurality housing such as that found on a matrix (See FIG. 12). A matrix is designed to have each of the plurality of air-tight, plastic-wrap seals 1002, complete with an inherent conductive path serviceable to this embodiment, concurrently (and independently) placed in a contactual manner with its respective soft-button 20 counterpart.

Similarly, a mountable-attachment matrix with housing designed to host a plurality of liquid-filled, air-tight, plastic-wrap seals 1002, each complete with an inherent conductive path serviceable to this embodiment, for actuation, may be replaced by less spatially intensive seals 1002 housing a plurality of conductive elements 106 arranged in a reciprocal environment (the arrangement being dependent on the soft-button controller to which the individual seal 1002 is respectively attached to and intended to actuate), similar to the appearance and arrangement of FIG. 2, plus the accretion of a cable 1008 component.

The material base surrounding and isolating the plurality of air-tight, plastic-wrap seals 1002 (each seal housing one or more conductive elements 106) may be non-conductive in nature, such as a base material of plastic or rubber. A plurality of cables 1008 may extend from the remote controller 1010 (not illustrated) and a plurality of the air-tight, plastic-wrap seals 1002, each complete with an inherent conductive path serviceable to this embodiment, may extend from a single cable 1008 (also not illustrated) in alternate embodiments.

The liquid conductor in the air-tight, plastic-wrap seal 1002 may be used in conjunction with a thin length of conductive wire—for example copper, but any conductive wire could be used—which has its bare, metallic tip immersed, anchored and wholly sealed in the conductive liquid located in the air-tight, plastic-wrap seal 1002 in order to form a conductive path and to prevent evaporation. The thin length of conductive wire, acting as a conductive element, is substantially housed in a connecting cable 1008 that acts as a wire conduit. The wire-end opposite to each tip inserted and sealed into a respective air-tight, plastic-wrap seal 1002, each seal complete with an inherent conductive path serviceable to this embodiment, is connected to a conductive element counterpart found on the remote actionable-object controller 1010. Thus, upon manipulation of the conductive input/element counterpart, it offers the user of the remote actionable-object controller 1010 positional and distance flexibility away from the touchscreen 10 as an actionable object 15 or player is being controlled. With the freedom of distancing the remote actionable-object controller 1010 from the portable-hardware's touchscreen 10—made possible through the described implementation of a tractable corded length of conductive wire according to an embodiment—the remote actionable-object controller 1010 can take on whole new design capabilities and more closely (and more broadly) borrow from the user experience and physical expression of the larger, console-based game controllers used in home consoles/gaming systems. Robust potential for controller customization exists in its spirit and scope.

Conductive elements 106 in whole or in transmissive part are made of any electrically-conductive material or materials, including but not limited to, conducting polymers such as polyaniline, conductive gels, conductive liquids, conductive inks, conductive wire and/or any material that is conductively (exhibiting conductivity) coated or dipped—such as with the use of treated foam, thread, or fibers—used alone, in filler compositions or in a series of conductive combinations, as aptly conjoined to ensure a proper conductive path remains present throughout.

This embodiment further illustrates the potential for the combination of different conductive materials or properties—used in a link—to complete a conductive path necessary as a means of controlling an actionable object 15 or player, in the spirit and scope of this discourse. The conductive path described herein is not suggestive of limitation or limitation to the elemental components comprising the path, as described. Therefore, without limitation, any conductive path that is serviceable to the spirit and scope of this discourse may be utilized for remote-operating scenarios. A conductive path may be comprised of a singular conductive component throughout the path or a conjoined plurality of distinct components comprising a path. The noted components can be designed on a similar scale to the hardware in which it is attached.

Figure 11:
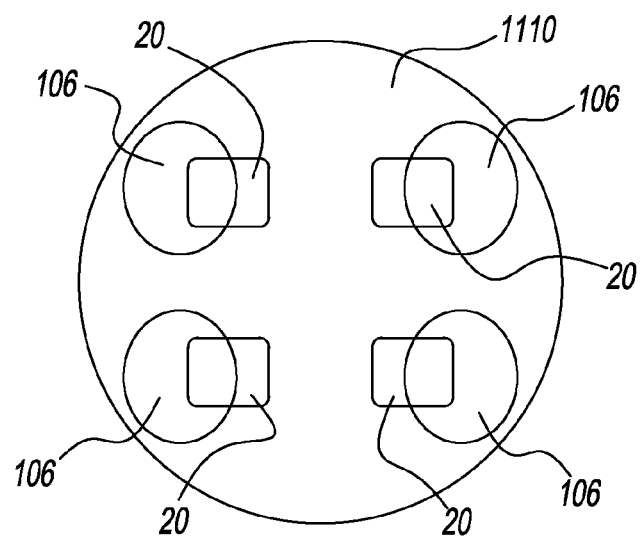
FIG. 11 illustrates a means of expanding the size of the touchscreen-controller attachment, against a fixed set of soft buttons, according to an embodiment.

FIG. 11 illustrates a means of expanding the size of a touchscreen-controller attachment 1110 associated with a fixed set of soft buttons 20; an initiative that may yield increased user comfort, control precision and tactile deployment, this according to an embodiment. Due to the small size of some touchscreens 10 and the potentially dense arrangement of soft buttons 20 this small footprint may yield, amongst other considerations, a user may wish to increase the actual size of the touchscreen-controller attachment 1110 beyond the original soft-button 20 parameter or alter the button disposition.

The conductive elements 106 are configured to contact the soft buttons 20 displayed on a user device 5 on the exterior edges of the soft buttons 20. Through external edge appropriation, the size of the touchscreen-controller attachment 1110 and/or button disposition is thus expanded (the expansion measurement of which is dependent on the variable of the transverse-perimeter dimensions of the soft buttons 20) in an effort to help improve user comfort, efficacy and control ergonomics, while still maintaining full functionality since a conductive path remains present in its spirit and scope. The noted components are ideally designed for the scale of the hardware to which it is attached.

Data-Entry Attachment

The present invention details an attachment-matrix overlay containing a plurality of conductive, elements that are fittingly tethered to both the graphical soft-buttons at the face of the attachable matrix and the respective hard keys of a specially-designed keyboard, keypad or data-entry device, through extension from the back of the attachable matrix, in order to facilitate the premise of remote data-entry for touch-screen based electronics or hardware, as equipped.

Figure 12:
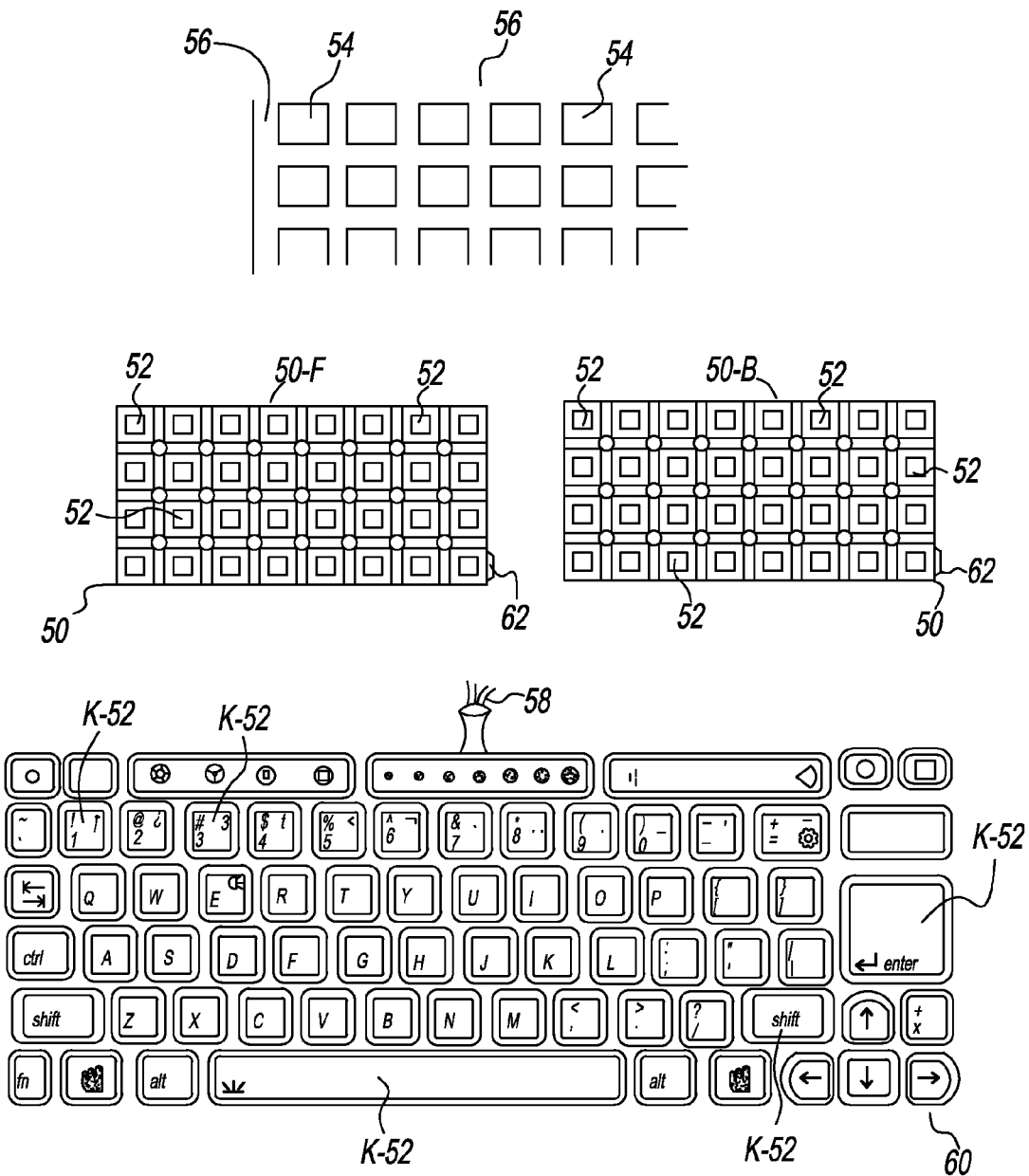
FIG. 12 is a listing, diagram of components related to a data-entry ensemble; including a touchscreen-controller attachment matrix—comprising a plurality of conductive elements; a receptive keyboard, keypad or data-entry device designed to engage soft data-entry or soft buttons and a hardware touchscreen; according to an embodiment.
Figure 13:
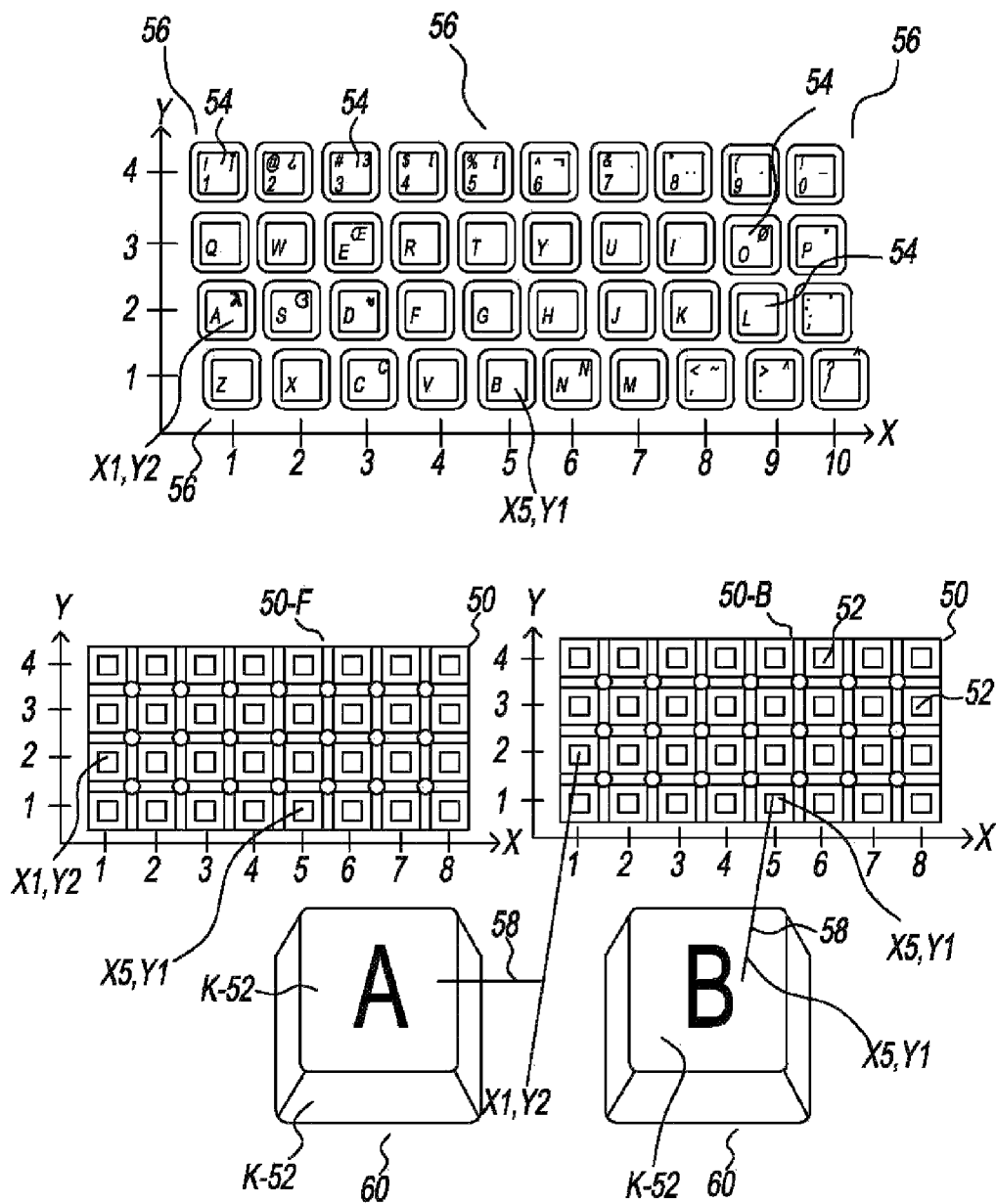
FIG. 13 is an associative diagram of the touchscreen-controller attachment matrix and its correct attachment sequence to the graphical or touchscreen-based soft buttons or data-entry buttons at the matrix's face 50-F and its integration with the conductive keys (partially illustrated for clarity using only two conductive keys or the actionable letters "A" and "B") of a receptive keyboard, keypad or data-entry device, via extension from the matrix's back.
Figure 14:
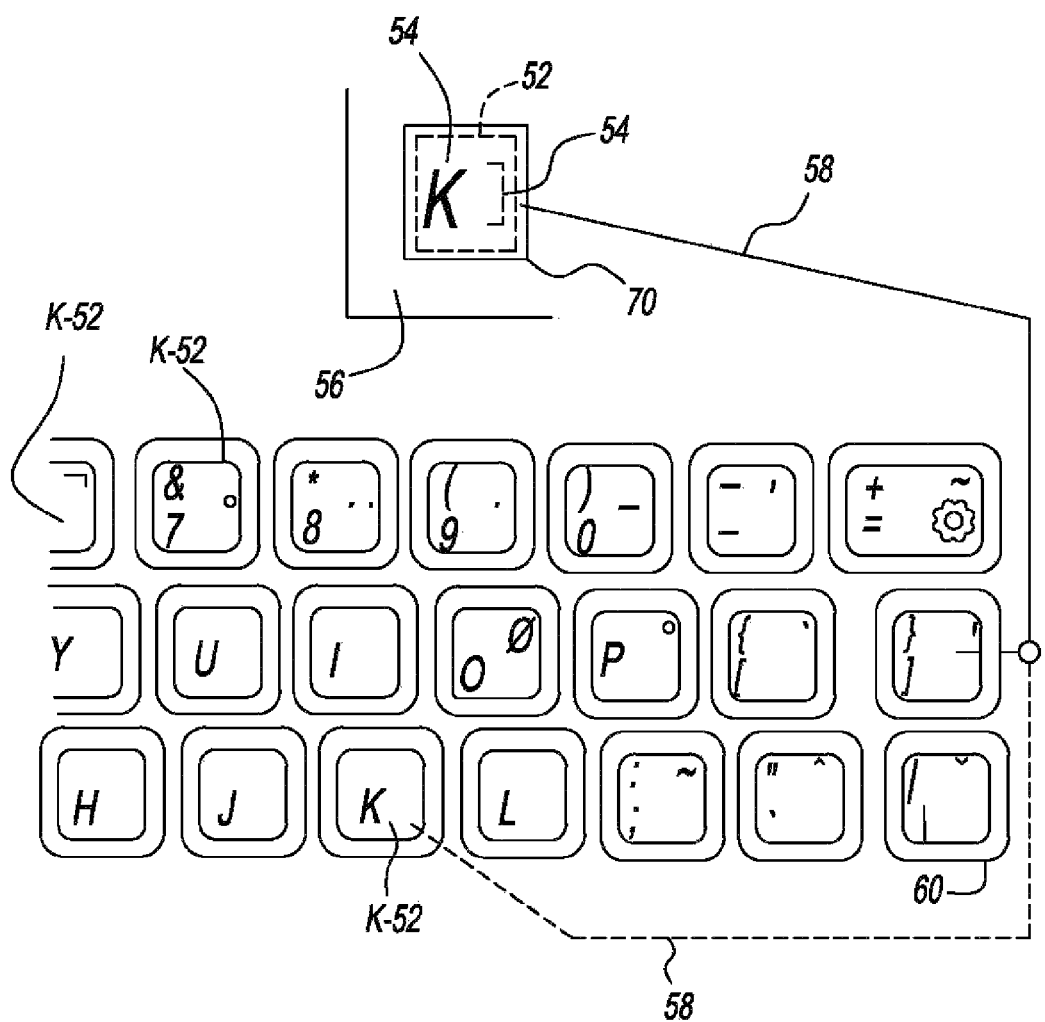
FIG. 14 is an illustration of an embodiment suggesting the premise of "toggle-mode", in the spirit and scope of this discourse.

It should be noted that in order not to congest the diagrams labeled in FIG. 12, FIG. 13 and FIG. 14, partial quantities of the conductive elements, the soft-buttons or data-entry buttons and the conductive "hard keys" or "physical keys" associated with a receptive receptive keyboard, keypad or data-entry device, may be illustrated and such illustrations are not intended to be limiting. A person skilled in the art (PSITA) should readily ascertain like quantities and composite characteristics of each of the groupings in the spirit and scope of this discourse.

FIG. 12 As a preamble to further detailed discussion; graphical soft or data-entry buttons 54 rendered on a hardware's touchscreen 56 include, but are not limited to, symbols, numbers, alphabetic characters, graphics; also navigation, function, toggle and modifier keys (such as Ctrl, Shift, Alt, and so forth); in the spirit and scope of this discourse.

The breadth of possible graphical soft-buttons or data-entry buttons 54 is expansive and includes any and all keyboard-based characters for purposes of this discourse; from both traditional and non-traditional keyboards—in both English and non-English languages.

Control of an actionable on-screen object, in this particular embodiment being data-entry buttons 54 such as symbols, numbers, alphabetic characters, graphics; and navigation, function, toggle and modifier keys, as a partial listing, are registered using the capacitance-sensing technology of the hardware's touchscreen 56 (although this embodiment is not intended to be limiting and does not preclude adaptation to other apropos screen-based technologies beyond capacitance that rely on touch input in the spirit and scope of this discourse) once a user initiates touch contact with the graphical soft-buttons or data-entry buttons 54 with the control input of a finger. Human skin has dielectric properties. While finger, thumb and/or stylus contact may be the most common means of capacitance transfer in the spirit and scope of this discourse, such a reference is not intended to be limiting in nature.

Referring now to the present invention in more detail. FIG. 12 represents an embodiment with a detached touchscreen-controller attachment matrix 50 containing a plurality of conductive elements 52; where each conductive isolate in the plurality (at the face 50-F of the matrix) is designed to be contactually affixed to its respective graphical soft-button or data-entry button 54 counterpart, in the spirit and scope of this discourse. The premise of being "contactually affixed" will be particularized by lineation in FIG. 13, with the introduction of co-ordinate mapping and further detailed in FIG. 14.

By aptly aligning to a point of contact, the respective conductive isolates of the conductive elements 52—found at the face 50-F of the touchscreen controller attachment matrix 50—with their graphical soft-buttons or data-entry buttons 54 counterparts displayed on the hardware's touchscreen 56, and then extending the conductive path of said conductive isolates to the respective conductive keys K-52 of a receptive keyboard, keypad or data-entry device 60, the capacitance stored, for instance, in the finger of a user, is transferred onto the hardware's touchscreen 56, once user contact with the conductive keys K-52 is initiated (unless a conductive key is spring-mounted and/or designed with a contactual gap and requires the user to concurrently touch, then depress a key for actuation, see FIGS. 4B, 5 for related discussion), just as if the user was touching the screen directly.

This process thereby permits control of actionable, on-screen symbols, numbers, alphabetic characters, graphics; and navigation, function, toggle and modifier keys, etceteras (data-entry buttons 54), remotely from the touchscreen 56 with the control input of a finger. Only now, an enhanced, more user-friendly data-entry interface exists that can help bolster comfort, ergonomics, productivity and simplicity of use; helping improve input efficacy due to the implementation of a more precise control structure, a greater familiarity of association to traditional data-entry based desktop and laptop input mechanisms and tactile touch discovery and orientation, amongst other potential betterments. This can significantly enhance the data-entry experience over the use of traditional touchscreen hardware in its native, attachment-less environment.

Each of the individual conductive elements 52, or a conductive isolate in the singular, of the plurality or series possesses conductive-path extension capabilities from the back 50-B or tethered-side of a touchscreen-controller attachment matrix 50. One possible means of extension (not illustrated), amongst others, is achieved by incorporating, through fusion or any other suitable manner faithful to a conductive path, a conductive length of wire 58 into each of the respective conductive elements 52 at the back 50-B or tethered-side of a touchscreen-controller attachment matrix 50—on one end—with care to ensure a conductive path remains present throughout, in the spirit and scope of this discourse. In preparation to trigger its control functionality, the touchscreen-controller attachment matrix 50 is then attached to the hardware's touchscreen 56, ensuring contactual consistency with the graphical soft-buttons or data-entry buttons 54. Each embedded conductive isolate remains wholly transmissive between the front and back of the matrix.

Conversely, the opposite end of the conductive length of wire 58 is respectively attached to the reciprocal conductive key or plurality of keys K-52 (a plurality is stated here as an acknowledgement for the distinction of toggle mode, which is discussed later in this filing); found on a receptive keyboard, keypad or data-entry device 60, in the spirit and scope of this discourse. The shape of the matrix 50 can be designed to be manipulated to match up with variously sized soft keys and touchscreens, for example by having the elements of the matrix 50 easily snap together and apart in various configurations or having a pliable matrix that appropriately maintains its shape until manipulated by a user, if coveted. Similarly, single conductive elements 52 may be manipulated individually to accommodate differences in the characters displayed on a touch screen, should design permit, although any examples cited for matrix manipulation are not suggestive of limitation.

The touchscreen-controller attachment matrix 50 and its plurality of conductive elements 52 are designed to be attached or affixed to the hardware's touchscreen 56 by any manner of attachment including, but not limited to, suction, static, removable adhesive backing, through an affiliation with a flexible, hardware-friendly sleeve or case or any attachment means for purposes suited thereof. The touchscreen-controller attachment matrix 50 may contain an exteriorly protruding tip 62 that can be used for convenient detachment of the touchscreen-controller attachment matrix 50 from the hardware's touchscreen 56.

The conductive elements 52, or any single conductive isolate of the plurality, in the spirit and scope of this discourse, can be made of any electrically-conductive material or combination of conductive materials as aptly conjoined, in whole, in transmissive part or in a series, including but not limited to, conducting polymers such as polyaniline, conductive gels, conductive liquids, conductive inks, conductive wire and/or any material that is conductively (exhibiting conductivity) dipped or coated—such as with the use of treated foam, thread, or fibers or related filler compositions, to which ensuring a proper conductive path remains present throughout in the spirit and scope of this discourse.

The conductive material comprising a single conductive element 52 or conductive isolate can differ from others in the plurality, but in this embodiment, remains consistent in order to streamline the manufacturing process and contribute to economies-of-scale advantages. The conductive elements 52 may be referred to in its singular form, as it has above: notably referencing a conductive isolate equivalent or an individual conductive element, bearing root from its plural counterpart and such singular or plurality references will be understood by those skilled in the art in the context they were intended, in the spirit and scope of this discourse.

Typically, the conductive elements 52 are individually insulated from each other to prevent contact with, and "conductive bleed" or "capacitive bleed" from, competing conductive elements 52; unless special-case operating scenarios require an instance of capacitive bleed. "Capacitive bleed" can result from improper shielding of the individual conductive isolates or related conductive apparatus. Since a plurality of conductive lengths of wire 58 (each constituting an instance of conductive elements 52) may exist contactually in cable conduit housing, this potential event underscores why shielding is especially important; as to ensure intended data-entry actions result as anticipated.

Note that while the conductive elements 52 can be concurrently attached to the hardware's touchscreen 56 by direct placement of the touchscreen-controller attachment matrix 50, as described herein, each individual conductive element 52 or conductive isolate, or plurality, can also be designed to be individually or separately attached/detached (without being conjoined to a stand-alone, touchscreen-controller attachment matrix 50 overlay) to/from the hardware's touchscreen 56, should it be desired. The language found in this description, and others situated in this filing is not intended to be limiting.

Ideally, the conductive elements 52 and corresponding touchscreen-controller attachment matrix 50 are dimensionally articulated and proportionate to the hardware ensemble they are designed for. The touchscreen-controller attachment matrix 50 is sufficiently wide and long to ensure the respective conductive elements 52 at its face 50-F are conductively aligned with the graphical soft-buttons or data-entry buttons 54, but not overly wide and long to unnecessarily block or encroach germane screen area or, similarly, skew any necessary contactual-alignment requirements. Embodiments and practical application can greatly diverge from the drawings in this and other figures. A matrix square containing a singular conductive isolate can vary greatly in dimension from a competing matrix square of a conductive isolate and standardization of squares and square dimension across a matrix is not requisite.

The conductive elements 52 conductively aligned with the graphical soft-buttons or data-entry buttons 54, are attached to the hardware's touchscreen 56 with care, ensuring each conductive isolate of the conductive elements 52 is not contactually aligned on a plurality of graphical soft-buttons or data-entry buttons 54 concurrently and that the graphical soft-buttons or data-entry buttons 54 remain directly actionable only from its intended conductive key or keys K-52, as summoned in the task of data-entry, unless otherwise required.

Ensembles of the present invention and any various embodiments listed will vary in degree of construction complexity. Construction can also differ to accommodate left-and-right handed preferences. Subjects, respective components and any sub-components found in FIG. 12 (and the filing in its entirety) may not be shown to exact specification or scale.

The attachable matrix 50 may also be incorporated as a stand-alone entity (although this is not the focus of this embodiment) where it seeks the control or touch input of a finger directly upon touchscreen attachment and does not require the path extended to the conductive keys K-52 of a receptive keyboard, keypad or data-entry device 60. The conductive elements 52, described collectively, or each respective isolate in the singular, may be transparent or translucent, minimizing any loss of view due to operational placement of the attachable matrix 50. Such an operating scenario may see a stand-alone matrix, for instance, be incorporated into a smart phone's mobile casing under a retractable design (to engage and disengage the matrix), in the spirit and scope of this discourse.

The user experience may be further improved when the disclosed premise of remote data entry is married, synergistically, to such technologies as: "Component AV Cables", that allow, exempli gratia, a compatibly-equipped smart phone to be connected—and to have its screen output transferred—to televisions fitted with component video inputs or similar linking technologies. Coupling with such technologies can help create an environment that even more profoundly liberates the texting or data-entry experience for users of touchscreen 56 hardware when compared to use in a native, attachmentless environment. Business travellers may find this coupling especially liberating.

Referring now to FIG. 13 in more detail, in an embodiment, a two-sided view of a touchscreen-controller attachment matrix 50 is shown (from a vantage of its face 50-F and back 50-B), with its set of conductive elements 52, each exhibiting uninterrupted conductive paths transversely across the entire thickness of the matrix. For clarification purposes regarding correct application of the face 50-F of the touchscreen-controller attachment matrix 50, a subset of a traditional QWERTY-based arrangement of graphical soft-buttons or data-entry buttons 54 is depicted (non-toggle mode) to suggest intended conductive lineation of the face 50-F of the matrix to the hardware's touchscreen 56, upon attachment.

Then, in order to more clearly depict transitional lineation, the back 50-B of the corresponding touchscreen-controller attachment matrix 50 is also produced in FIG. 13 to show a completed conductive path from an input end to an output end, amongst the illustrated parts, in the spirit and scope of this discourse. The back is shown from a top-down orientation, as if looking down at the touchscreen-controller attachment matrix 50, with the front 50-F vantage naturally obstructed from view upon matrix application in practice (hence, the inventor has chosen a side-by-side illustrative manner here for simplicity). The back 50-B of the corresponding touchscreen-controller attachment matrix 50 shows an extension of its conductive elements 52 to the conductive keys K-52 (in this case, 2 keys, the actionable letters "A" and "B", respectively, representing only a constituent view of the full set of keys ordinarily present in a QWERTY design) of a receptive keyboard, keypad or data-entry device 60. Said differently, the conductive elements 52 found at the back 50-B of the corresponding touchscreen-controller attachment matrix 50 are conductively married, to an appropriate input counterpart, by extension via conductive lengths of wire 58 (as a possible, but not an exclusive means of extension) to the corresponding conductive keys K-52 (key-based conductive elements 52), as situated on a receptive keyboard, keypad or data-entry device 60. Again, the actionable letters "A" and "B" are only a partial representation of the actionable physical keys typically available in a traditional QWERTY environment (a subset of a toggle environment) and the array and disposition of both the graphical soft-buttons or data-entry buttons 54 and conductive keys K-52 displayed in practice can differ widely from this illustration and are not suggestive of limitation.

The conductive element 52 individually assigned and aptly attached (via a conductive isolate found at the face 50-F of the touchscreen-controller attachment matrix 50) to the "A" key of the graphical soft-buttons or data-entry buttons 54 found on the hardware's touchscreen 56, will then see said conductive isolate assigned, while maintaining an inherent conductive path, from the back 50-B of the corresponding touchscreen-controller attachment matrix 50, to the "A" key found on the specially designed keyboard comprising a plurality of conductive keys K-52—composed of conductive elements 52—in the spirit and scope of this invention.

To illustrate contactual placement of a single conductive isolate (comprising the conductive elements 52) found at the face 50-F of the touchscreen-controller attachment matrix 50, with the respective graphical soft-buttons or data-entry buttons 54 found on the hardware's touchscreen 56, an X,Y grid is shown adjacent to both the touchscreen-controller attachment matrix 50 (dual sides) and graphical soft-buttons or data-entry buttons 54, to demonstrate correct contactual positioning that is serviceable to this embodiment. The "A" key of the graphical soft-buttons or data-entry buttons 54, for example, is located at position X1, Y2 and noted. The respective "A" key position at the noted position X1, Y2 on the matrix seeks contactual overlay—upon attachment of the touchscreen-controller attachment matrix 50 at its face—with its data-entry button 54 counterpart. Successful contactual placement of the touchscreen-controller attachment matrix 50 with the graphical soft-buttons or data-entry buttons 54, in the spirit and scope of this discourse, will see each set of the identical X,Y coordinates in the control structure (comprising a conductive path) matched in their totality upon matrix overlay. A typical matrix can have some of its individual conductive isolates vary in size, positioning and structure (versus the identical grid-composition of the matrix illustrated here) to more closely reflect the graphical renderings on the hardware's touchscreen 56 to which it marries and this illustration is not suggestive of limitation.

Similarly, the conductive elements 52 assigned and aptly attached (via a conductive isolate found at the face 50-F of the touchscreen-controller attachment matrix 50 at position X5,Y1) to the "B" key of the graphical soft-buttons or data-entry buttons 54 (at position X5,Y1) found on the hardware's touchscreen 56, will then see said conductive isolate similarly assigned, ensuring a conductive path remains present, to the "B" key found on the specially designed keyboard, keypad or data-entry device comprising conductive keys K-52 (composed of conductive elements 52) from a rear-modal matrix extension (at position X5,Y1), in the spirit and scope of this discourse. And so on, preferably until all available graphical soft-buttons or soft data-entry buttons 54 of a given application (in both toggle and non-toggle mode on a hardware's touchscreen 56) are properly accounted for and conductively married to their respective conductive keys K-52 on a receptive keyboard, keypad or data-entry device 60.

Illustrations shown in FIG. 13, and throughout all diagrams, are not necessarily to scale and may be prone to modification, adaptation and/or variance in practical application, in the spirit and scope of the present invention. Disclosures and renderings herein are not intended to be limiting. A person skilled in the art (PSITA) may also seek referral to FIG. 12 and other embodiments to appreciate the broad spirit and scope of this embodiment.

FIG. 14 details the premise of toggle mode, with a simple, hypothetical illustration of a plurality of graphical soft-buttons or data-entry buttons 54 that interchangeably share a fixed location on a touchscreen (and affixed matrix), as various character sets are deployed in a toggle on a touchscreen 56. In this hypothetical example, and disclosed embodiment, the graphical soft-buttons or data-entry buttons 54 "K" and "J" share the same fixed screen location, but not concurrently, each of these keys becomes enlisted to a shared fixed screen location only when actuated by a toggle; in which both keys are typically rendered independently, as part of a set of touchscreen keys or characters in an aggregate set or rendering. Toggle mode, in the spirit and scope of this discourse, may be necessary when a touchscreen's geography is limited in size (such as with the physical constraints instanced in a mobile environment). It would, for example, not usually be either efficient or practical for pocket-sized, Internet-enabled smart phones to fit the entire QWERTY-based keyboard in a single, graphical-rendering entirety on its limited touchscreen size. Toggle mode makes, exempli gratia, the QWERTY-load more manageable. Arrangements and character sets of the graphical soft-buttons or data-entry buttons 54 displayed in practice may vary from those depicted in this hypothetical example (and elsewhere) and merely serve as a guide to understanding the premise of toggle mode.

Where a toggle is effected for graphical soft-buttons or data-entry buttons 54 that share a fixed geography or position (toggle area) on the hardware's touchscreen 56, a conductive length of wire 58 is fused (or conductively attached in any appropriate manner) to the conductive isolate at the real-modal matrix point sharing a toggle area 70 upon contactual placement. An additional conductive length of wire 58 intended to actuate a shared toggle area is then attached accordingly, either directly at the same matrix point of the conductive isolate sharing a toggle area 70 (not shown) or along the corded length of an established conductive length of wire 58 (shown in phantom as a dashed line), careful to ensure a conductive path remains throughout, in the spirit and scope or this invention.

The respective conductive lengths of wires used in a toggle situation described above, will, at the corded lengths opposite the touchscreen-controller attachment matrix 50 fusion and/or amalgamation points (and at each respective conductive isolate comprising the matrix at full employment) be attached to the respective conductive keys K-52 on a receptive keyboard, keypad or data-entry device 60 in order to facilitate keyboard-based text or data entry, remotely from a touchscreen 56. The fusion point is the point where the wire meets the attachment matrix 50 and the amalgamation point is the point where the wires from the different conductive keys K-52 are joined, although in some operating scenarios, no amalgamation point exists because the wires may see direct contact with the attachment matrix 50 at the conductive isolate. A person skilled in the art (PSITA) may also seek referral to FIG. 12 and other embodiments to appreciate the spirit and scope of this discourse.

Figure 15:
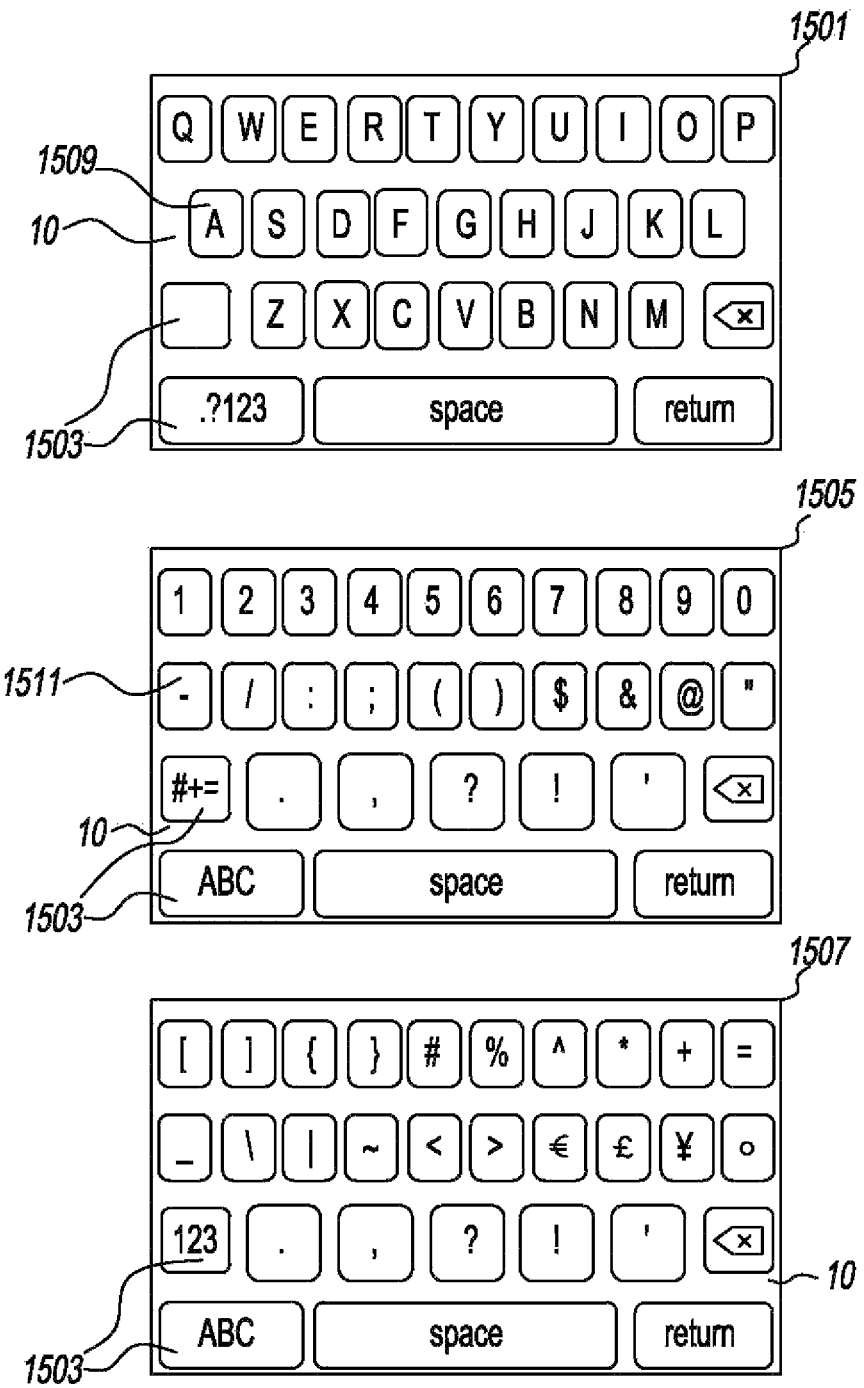
FIG. 15 is an illustration of a plurality of various character or keyboard sets that are linked in a toggle, the premise of "toggle" being requisite for devices subject to space limitations.

FIG. 15 illustrates three distinct character sets or digital "keyboards" presented on a touchscreen 10; each of which rely on a "toggle" for activation—the premise of "toggle" being requisite for devices subject to space limitations. In this embodiment, a QWERTY keyboard 1501 is displayed. With a QWERTY allocation encompassing nearly the entire touchscreen 10 as shown, despite the diminutive status of each individual key, there is not sufficient room for additional sets of numbers or special characters to be displayed concurrently. The solution to such space constraint is the toggle.

The upper-toggle button 1503 in the third frame 1507, for instance, changes the displayed keys to a "numerical-based set" 1505 (second frame), whilst the lower toggle button 1503 in the same frame reverts back to the QWERTY set. To engage additional punctuation and the special characters set of 1507, the user would simply touch the upper-toggle button 1503 in the second frame 1505; allowing a user to refresh to a new character set in the same, fixed space. Both useful and germane to the small footprint.

The letter "A" 1509 and dash "-" 1511 share a location, or toggle area, on the touchscreen 10. Thus, on the data-entry device, both the "A" and "-" keys are conductively married to the matrix point adjoining this shared area of the touchscreen 10, allowing the data-entry device to be used in similar fashion to a desktop environment in attribute to the present invention. A "toggle" need not exclusively be triggered by contact with a "toggle character" and instead a data-entry device can also contain a "toggle button" or set of "toggle buttons" that cue the respective character sets automatically (conductive-path wiring not shown) when a "toggle button" is touched, then depressed (if, like in a previous embodiment, the key is spring mounted or requires downward pressure to be contactually engaged) or otherwise receives touch input. A receptive keyboard, keypad or data-entry device 60 can be designed to automatically shuttle between toggle sets, when, for instance, a button on the data-entry device is pressed that does not have its corresponding soft key currently displayed on the touchscreen 10. A data-entry device and related processor can, for instance, toggle to an appropriate screen before actuating the intended key stroke via an innate capacitive source and manager, refer to FIG. 9 for related discussion). The data-entry device may default back to a set of characters such as the QWERTY set or remain static to the character set of the first keystroke entered after a "toggle button" has been initialized and can be completely customizable (setting defaults manually, for instance in an option to customize toggle behavior) in certain incarnations.

Amongst a list of functional electronics, the keyboard may contain memory storage, a specially designed matrix attachment with OCR capability, broad wireless functionality, including near-field communications (NFC), for pairing with a user device 5, a miniature LCD with, amongst other means, message storage and draft output capability and, as referenced, a device processor that powers such improved functionality, amongst other possible functionalities divined by those skilled in the art and not detailed here. Such discourse is not intended as a limitation on the breadth and scope of the present invention.

The conductive data-entry attachment and ensemble, like its conductive actionable-object controller counterpart, can leverage the use of both haptic and wireless technologies to empower functionality. Haptic inclusion may prove useful, for example, if a person was to use a keyboard, keypad or data-entry device, in the spirit and scope of this discourse, for game play, such as with a text-based adventure or role-playing game.

For purposes of disclosure, touchscreen based hardware—and references to a hardware's touchscreen—include any and all touchscreen-based technologies within the spirit and scope of this discourse, premised on the ability for adaptation beyond those that are capacitive and capacitance governed. The present invention may, for example, require certain, modifications and engineering protocol to actualize functionality for non-capacitive based touchscreen—such as those with resistive touchscreen technologies that sense contactual pressure differently than a capacitive touchscreen. For instance, a spring-mounted touch element requiring downward pressure to effect point-of-contact with a touchscreen display vs. an operating scenario of perpetual touch-element contact with a touchscreen display may be an underlying modificative transition for resistive touchscreen technologies. For any touchscreen technology that relies on an electric signal to determine, the location of touch, embodiments disclosed herein may function as described without substantial modification and those skilled in the art will appreciate any modificative qualifiers that may be necessary regarding the type of input electrical signal.

For touchscreen technologies relying on physical contact with/pressure change on a touchscreen 10, such as with resistive, surface acoustic wave, infrared, optical imaging, dispersive signal technology and acoustic pulse recognition touchscreens, modification may generally be needed for remote input embodiments to convert the conducted electrical signal into a point of pressure on the touchscreen 10. Notwithstanding any disclosed embodiments that can result in a point of pressure being created on a touchscreen 10 and the possibility for trans-interoperability between differing touchscreen technologies that this represents, this can additionally be accomplished, for example, by coupling actuators to the conductive elements; which exert pressure on the touchscreen 10 when a signal is received due to touch input or manipulation of the opposing end or the input end of the controller in a conductive path. A intermediary-transceiver device could also be readily designed to convert input manipulation into point-of-pressure contact on a touchscreen 10 to cater to demands of those touchscreens. An innate capacitive source and manager could, for example, be replaced by a system of mechanical relays of "contactual pistons". Embodiments are disposed to modification and combination. Although some embodiments are shown to include certain features, the applicant specifically envisions that any feature disclosed herein may be used together or in combination with any other feature on any embodiment of the invention. It is also envisioned that any feature may be specifically excluded from any embodiment of an invention.

While the noted embodiments and accompanying discourse and illustrations of the invention disclosed herein can enable a person skilled in the art (PSITA) to make and use the invention in its detailed exemplary embodiments, a skilled artisan will understand and appreciate the actuality of variations, modifications, combinations, atypical implementations, improvements and equivalents of any of the specific embodiments, methods, illustrations and examples listed herein.

While the present invention has been described with reference to such noted embodiments, methods, illustrations and examples, it is understood by a skilled artisan that the invention is not limited to any of the disclosed embodiments, methods, illustrations and examples, but by all embodiment, methods, illustrations and examples within the spirit and scope of the invention. The scope of the following claims, and the principles and novel features, amongst the discourse herein, is to be accorded the broadest interpretation so as to encompass all modifications, combinations, improvements and equivalent structures and functions Any particular terminology describing certain features or aspects of the invention is not suggestive of language restricted to any specific characteristics, features, or aspects of the invention with which that terminology is associated. Furthermore, any reference to claim elements in the singular, for example, using the articles "a," "an," or "the," is not to be construed as limiting the element to the singular.

The invention claimed is:

1. A non-traditional input device for a video-game environment, comprising:
   an attachable member for attachment to a receiving end of a separate intermediary-transceiver device;
   a non-traditional input interface with an embedded RFD communication interface configured to communicate game data by wire, wirelessly or both to said intermediary-transceiver device;
   wherein said intermediary-transceiver device is powered by an internal or external power source and not by the non-traditional input interface;
   wherein said intermediary-transceiver device acts as a synchronizing relay agent for receiving and/or transmitting video game input directives by wire, wirelessly or both for mediating said input directives; and
   wherein manipulating an input associated with the attachable member upon attachment to the receiving end results in correlative engagement of a touchscreen device's soft counterpart using said transceiver device.

2. The non-traditional input device for a video-game environment of claim 1, comprising a NFC communication interface.

3. The non-traditional input device of claim 1, wherein the non-traditional input interface comprises a rotatable trackball controller configured for operation in a touchscreen controller environment.

4. The non-traditional input device for a video-game environment of claim 1, further comprising a haptic communication interface.

\* \* \* \* \*